Dec. 17, 1963 E. J. GRISET, JR., ETAL 3,114,372
COLLAGENOUS ARTICLE AND THE MANUFACTURE THEREOF
Filed April 12, 1961 16 Sheets-Sheet 3

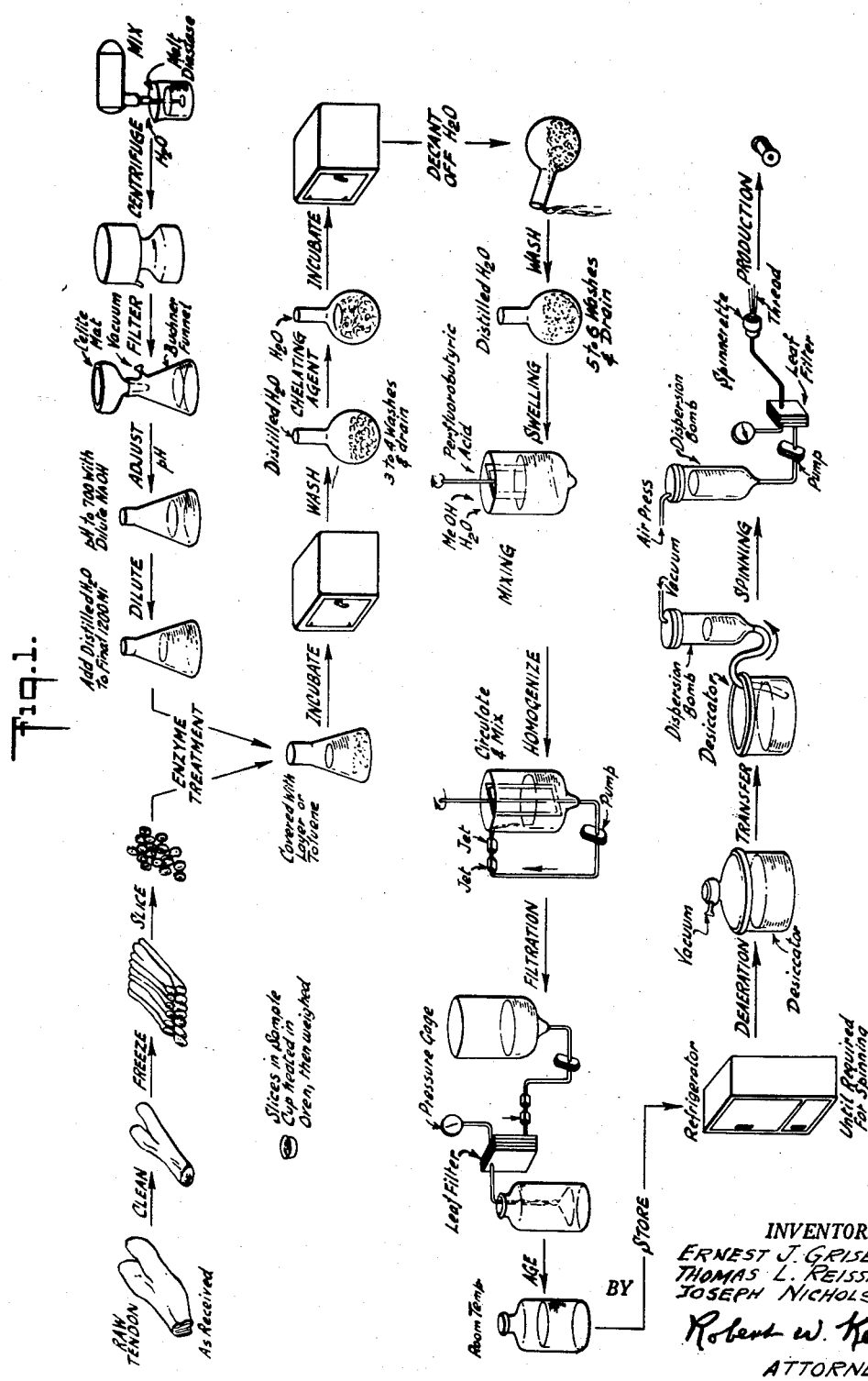

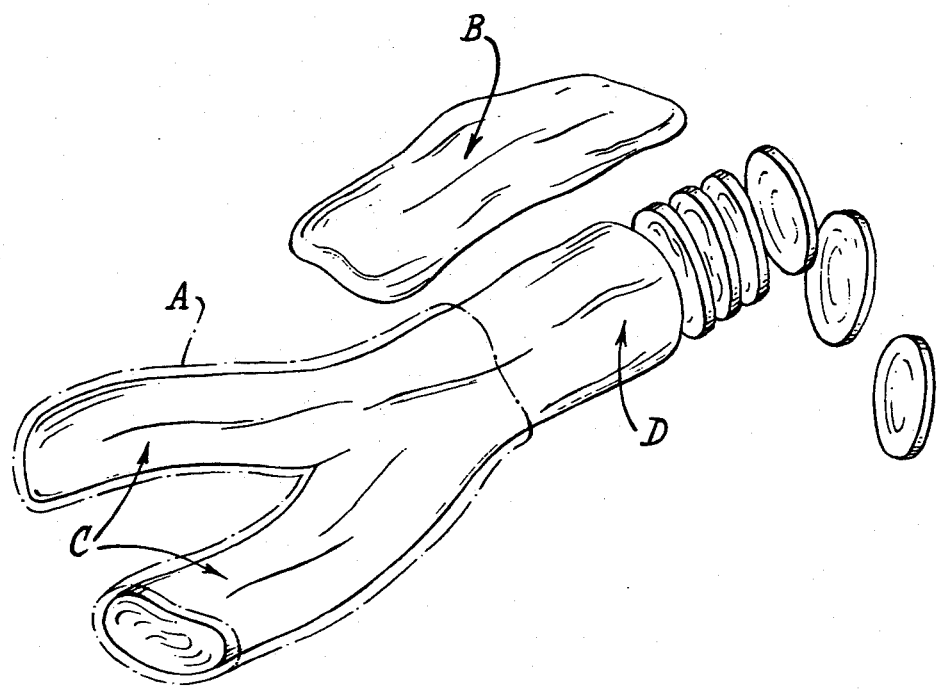

INVENTORS.
ERNEST J. GRISET JR.
THOMAS L. REISSMANN
BY JOSEPH NICHOLS

Robert W. Kell
ATTORNEY

INVENTORS.
ERNEST J. GRISET JR.
THOMAS L. REISSMANN
BY JOSEPH NICHOLS

Robert W. Kell
ATTORNEY

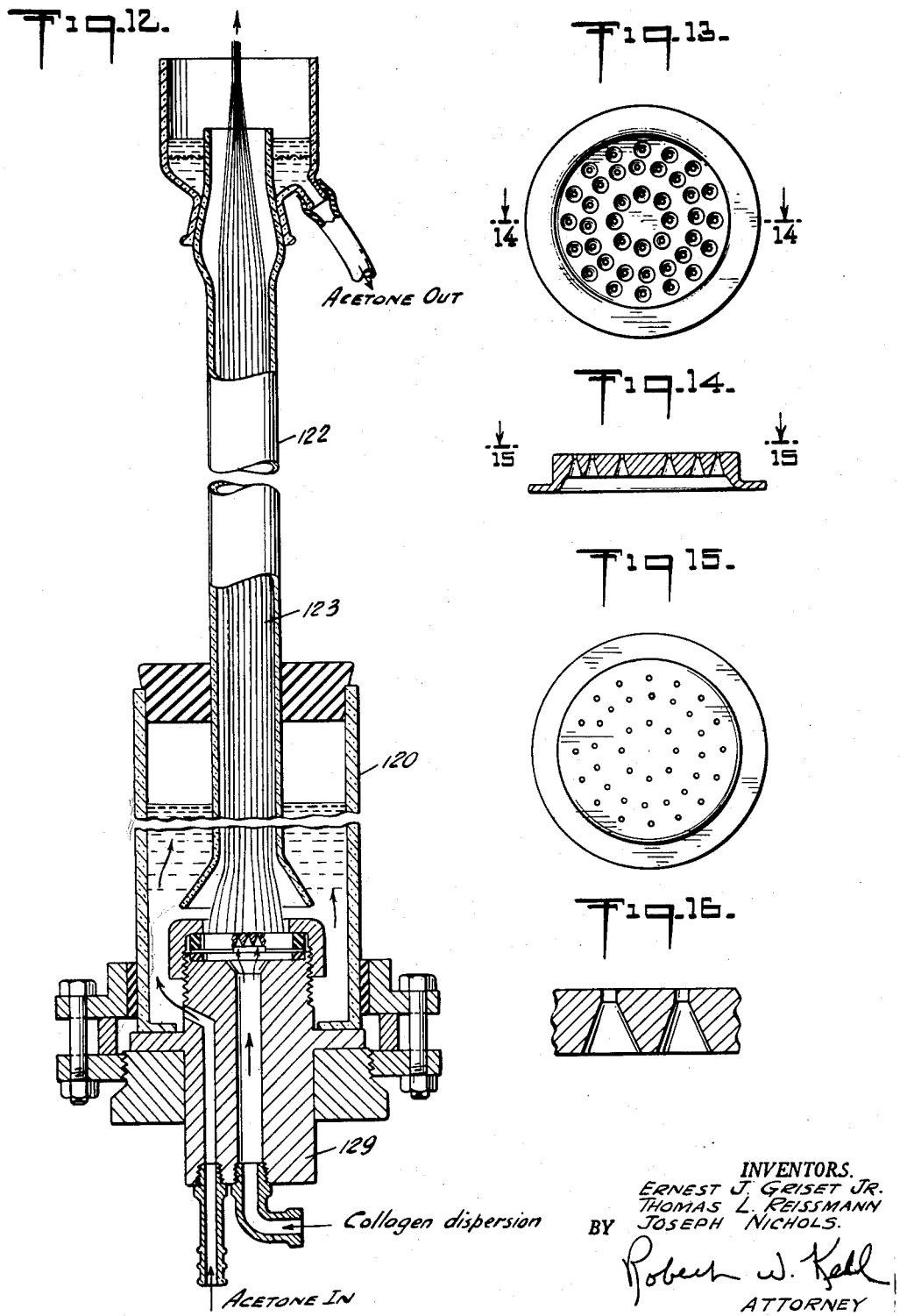

Dec. 17, 1963 E. J. GRISET, JR., ETAL 3,114,372
COLLAGENOUS ARTICLE AND THE MANUFACTURE THEREOF
Filed April 12, 1961 16 Sheets-Sheet 8

INVENTORS.
ERNEST J. GRISET JR.
THOMAS L. REISSMANN
BY JOSEPH NICHOLS.

Robert W. Kell
ATTORNEY

Dec. 17, 1963     E. J. GRISET, JR., ETAL     3,114,372
COLLAGENOUS ARTICLE AND THE MANUFACTURE THEREOF
Filed April 12, 1961                          16 Sheets-Sheet 10
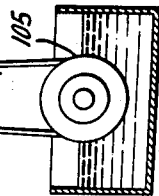
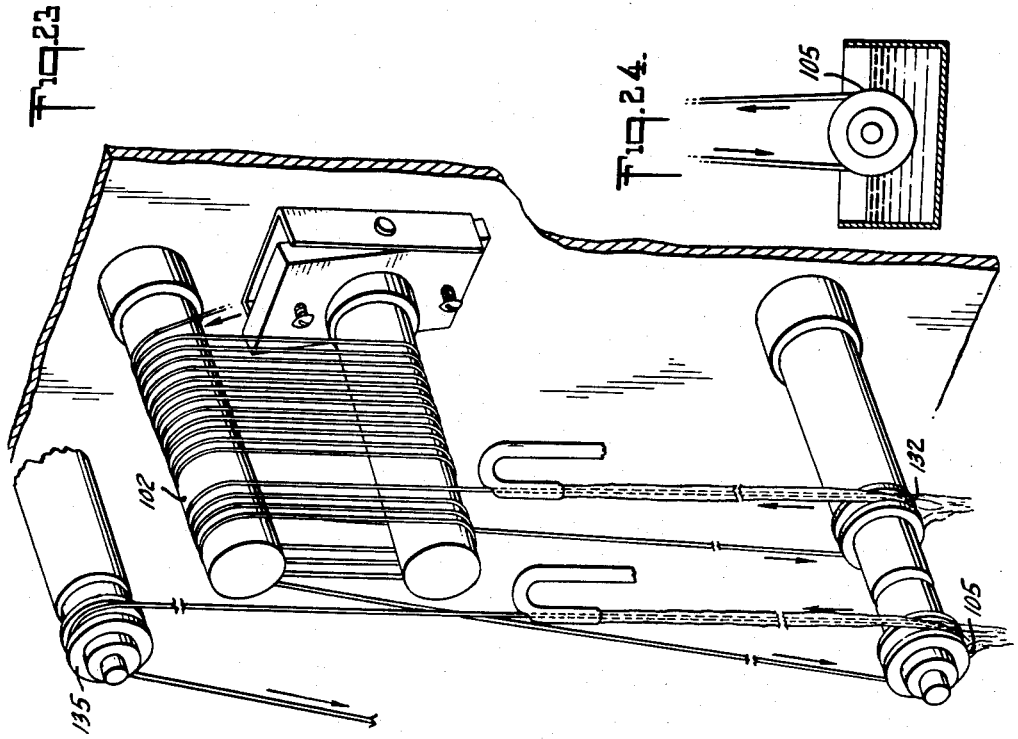
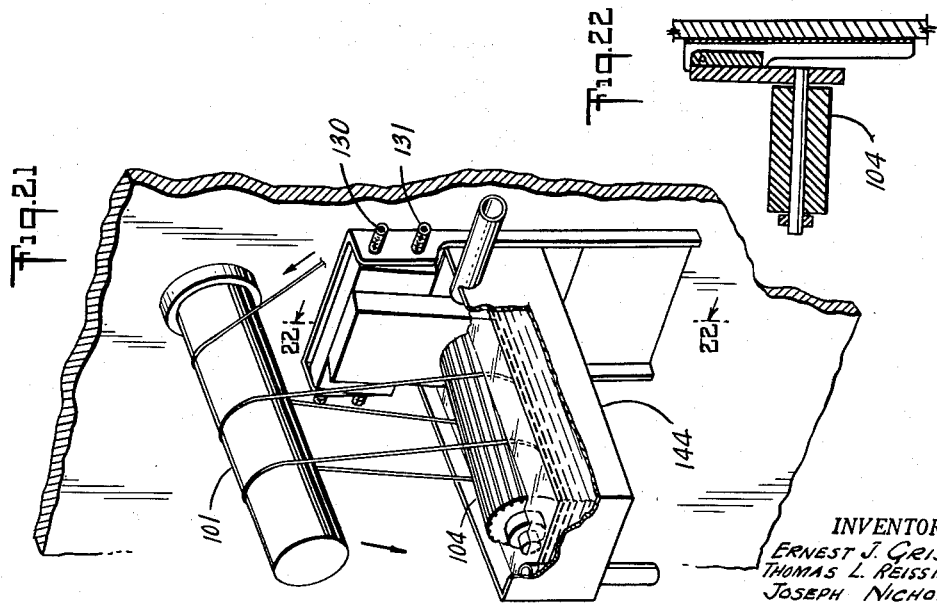
INVENTORS:
ERNEST J. GRISET JR.
THOMAS L. REISSMANN
JOSEPH NICHOLS
BY Robert W. Kell
ATTORNEY

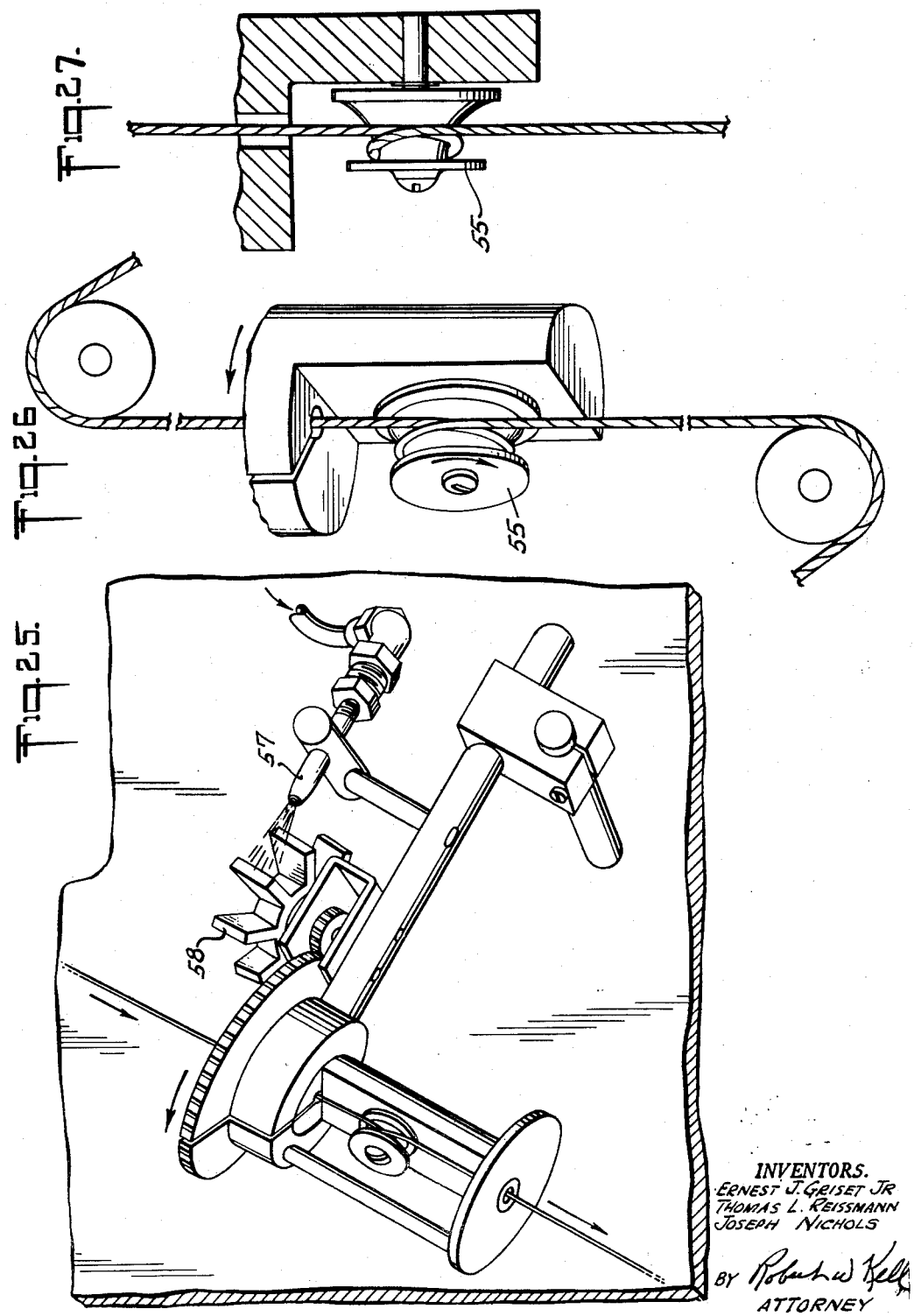

Dec. 17, 1963   E. J. GRISET, JR., ETAL   3,114,372
COLLAGENOUS ARTICLE AND THE MANUFACTURE THEREOF
Filed April 12, 1961   16 Sheets-Sheet 12

INVENTORS:
ERNEST J. GRISET JR.
THOMAS L. REISSMANN
JOSEPH NICHOLS
BY
Robert W. Kell
ATTORNEY Dec. 17, 1963 E. J. GRISET, JR., ET AL 3,114,372
COLLAGENOUS ARTICLE AND THE MANUFACTURE THEREOF
Filed April 12, 1961 16 Sheets-Sheet 16

INVENTORS
ERNEST J. GRISET JR.
THOMAS L. REISSMANN
JOSEPH NICHOLS
BY
Robert W. Kell
ATTORNEY

United States Patent Office 3,114,372
Patented Dec. 17, 1963

3,114,372
COLLAGENOUS ARTICLE AND THE
MANUFACTURE THEREOF
Ernest J. Griset, Jr., and Thomas L. Reissmann, Bound Brook, and Joseph Nichols, Princeton, N.J., assignors to Ethicon, Inc., a corporation of New Jersey
Filed Apr. 12, 1961, Ser. No. 102,533
9 Claims. (Cl. 128—335.5)

This invention relates to strand-like materials such as absorbable sutures and ligatures made from collagen fibrils.

For the sake of clarity, the terms used herein are defined as follows:

The term "swollen collagen fibril," as used herein, means a thread-like collagen structure that has been swollen in acid solution to a diameter of about 5,000 to about 90,000 Angstrom units.

The term "monofilament," as used herein, means a single thread of oriented collagen fibrils as extruded through a single orifice in a spinnerette.

The term "multifilament," as used herein, means a group of individual separate collagen filaments extruded through a spinnerette.

The term "tape," as used herein, means a group of individual monofilaments that have been united to form a unitary structure that is ribbon-like in shape.

The term "strand," as used herein, means a group of individual monofilaments that have been united to form a unitary structure of circular cross-section.

It is an object of the present invention to provide a collagen multifilament, the individual monofilaments of which may be united to form a continuous strand of cohered parallel monofilaments having unusual physical properties.

It is also an object of this invention to provide shaped articles of collagen suitable for surgical use by continuously extruding a dispersion of swollen collagen fibrils into a dehydrating bath.

It is a further object of this invention to provide a continuous unitary strand from parallel monofilaments of oriented collagen fibrils having characteristics superior to surgical sutures derived from gut.

The objects of this invention may be realized by extruding a homogeneous dispersion of pure swollen collagen fibrils into a dehydrating bath to form multifilament. The multifilament may be further processed, for example, by wetting out, washing, tanning, twisting and stretching in proper sequence to obtain a strand or tape of uniform diameter and physical properties. In the practice of the present invention, therefore, a dispersion of swollen collagen fibrils is extruded to form continuous filaments in which the individual collagen fibrils are oriented parallel to the major axis of the filament. The multifilament is then further processed to form a rounded strand of parallel monofilaments having a uniform cross-section.

The basic raw material entering into the manufacture of extruded collagen sutures by the present process consists of a dispersion of swollen collagen fibrils which may originate in different animal species or in different tissues within a single species. These collagen fibrils are characterized by having a uniform diameter, a periodic cross-banding measuring about 640 Angstroms per unit and the ability to swell reversibly in aqueous acid solution. Collagen fibrils from beef leg tendon are preferred.

It is important in preparing a dispersion of swollen collagen fibrils suitable for extrusion and spinning that the removal of impurities naturally present in mammalian tendon, and the separation of the longitudinally arranged fibrils to form a homogeneous dispersion, be effected under conditions that avoid solution or degradation of the collagen fibrils. The tensile strength of the extruded product is dependent upon retaining the original collagen fibril structure.

In the spinning process, the homogeneous dispersion of swollen collagen fibrils is extruded into a ketone dehydrating bath through a spinnerette which orients the individual collagen fibrils in a direction parallel to the direction of extrusion. It has been postulated that the ultimate strength of the extruded filament is related to the lateral bonds between collagen fibrils. Thus, a parallel alignment of the individual fibrils is highly desirable as such an arrangement will provide the maximum number of lateral bonds, and the maximum tensile strength.

The extruded filaments are stretched to further orient the collagen fibrils and may be collected as a multifilament or cohered to form a tape or strand. The nature of the product obtained (multifilament, tape or strand) will depend upon the spinning process employed.

In the "direct" spinning process, the multifilament from the dehydrating bath may be wet out, stretched, twisted, tanned, and then stretched and twisted a second time while still wet with the tanning solution. This process gives a collagen strand that may be used as an absorbable suture. Such collagen strands have a tensile strength, knot strength, and flexibility that is equivalent to that of sutures made from sheep intestines.

In the "indirect" spinning process, the multifilament from the dehydrating bath is not wet out prior to stretching, twisting and drying. The multifilament is stored as such or as tape. The number of individual filaments in the multifilament or tape will determine the diameter of the final strand. Thus, the "indirect" spinning process is convenient for manufacturing sutures of different sizes, and particularly large size sutures.

The invention will appear more clearly from the following detailed description when taken in connection with the accompanying drawings, which show, by way of example, preferred embodiments of the inventive idea.

Referring now to the drawings:

FIGURE 1 is a flow diagram illustrating the sequence of steps in preparing a dispersion of pure collagen fibrils from animal tendon.

FIGURE 2 is a drawing of a preferred source of collagen—the deep flexor tendon as obtained from cattle.

FIGURE 12 is a detailed sectional view of a spinnerette and the associated spinning column and dehydrating bath arranged for vertically upward spinning.

FIGURE 13 is an inverted plan view of an improved spinnerette.

FIGURE 14 is a sectional view of the spinnerette taken on the line 14—14 of FIGURE 13.

FIGURE 15 is a plan view of the spinnerette illustrated in FIGURE 13.

FIGURE 16 is an enlargement of a portion of FIGURE 14 that better illustrates the taper of the spinnerette orifices.

FIGURE 21 is a detailed perspective view of a part of the spinning machine showing the godet 101 which takes up the strand from the dehydrating bath. This figure also shows the idler 104 which is associated with the godet 101.

FIGURE 22 is a side elevation of the idler 104 illustrated in FIGURE 21.

FIGURE 23 is a perspective view of the tanning section of the spinning machine and illustrates one method of continuously tanning the moving strand.

FIGURE 24 is an end view of the idler pulley 105 of FIGURE 23 with the tanning bath in position.

FIGURE 25 is a perspective view of a false twister which is used to round the strand and dry the strand during the spinning process.

FIGURE 26 is an enlarged view illustrating the feature of the false twister of FIGURE 25 which facilitates threading the spinning machine.

FIGURE 27 is a sectional view of the false twister illustrated in FIGURE 26.

Figure 28:
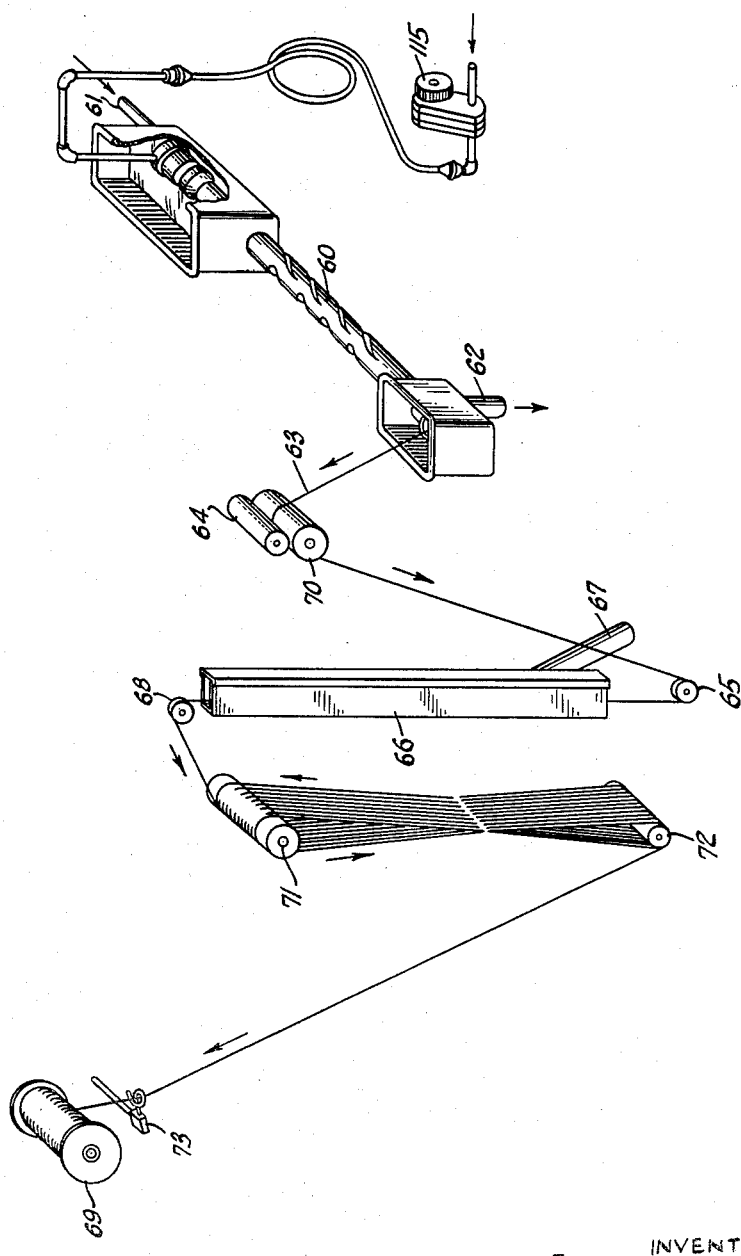

FIGURE 28 is a schematic view of a spinning machine that may be used in the manufacture of continuous collagen tape.

Figure 29:
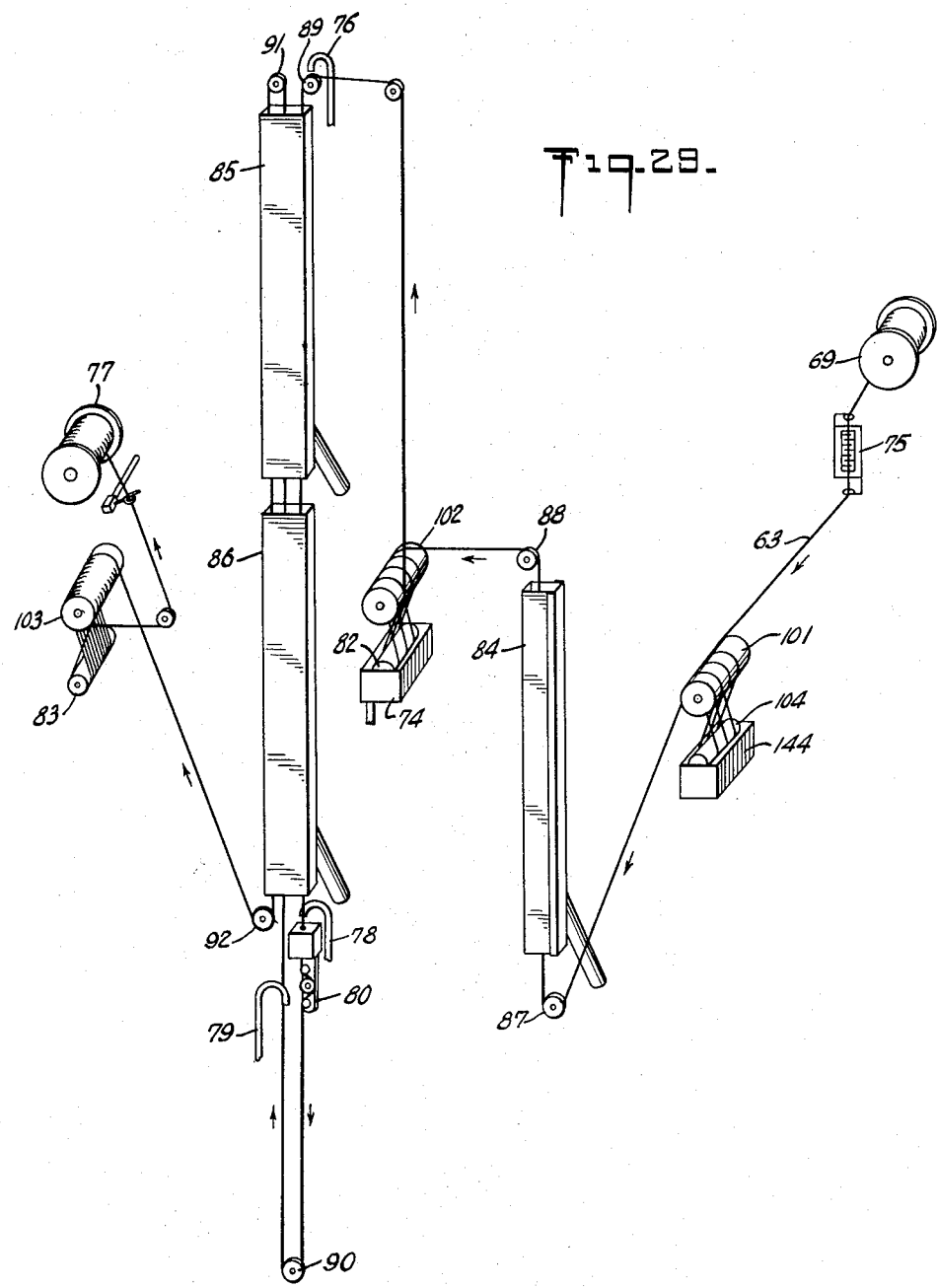

FIGURE 29 is a schematic view of a machine that may be used in the manufacture of collagen strands from collagen tape in the "indirect" spinning process.

Figure 30:

FIGURE 30 is an electron micrograph of a whole mount of swollen tendon collagen fibrils stained with phosphotungstic acid.

Figure 31:
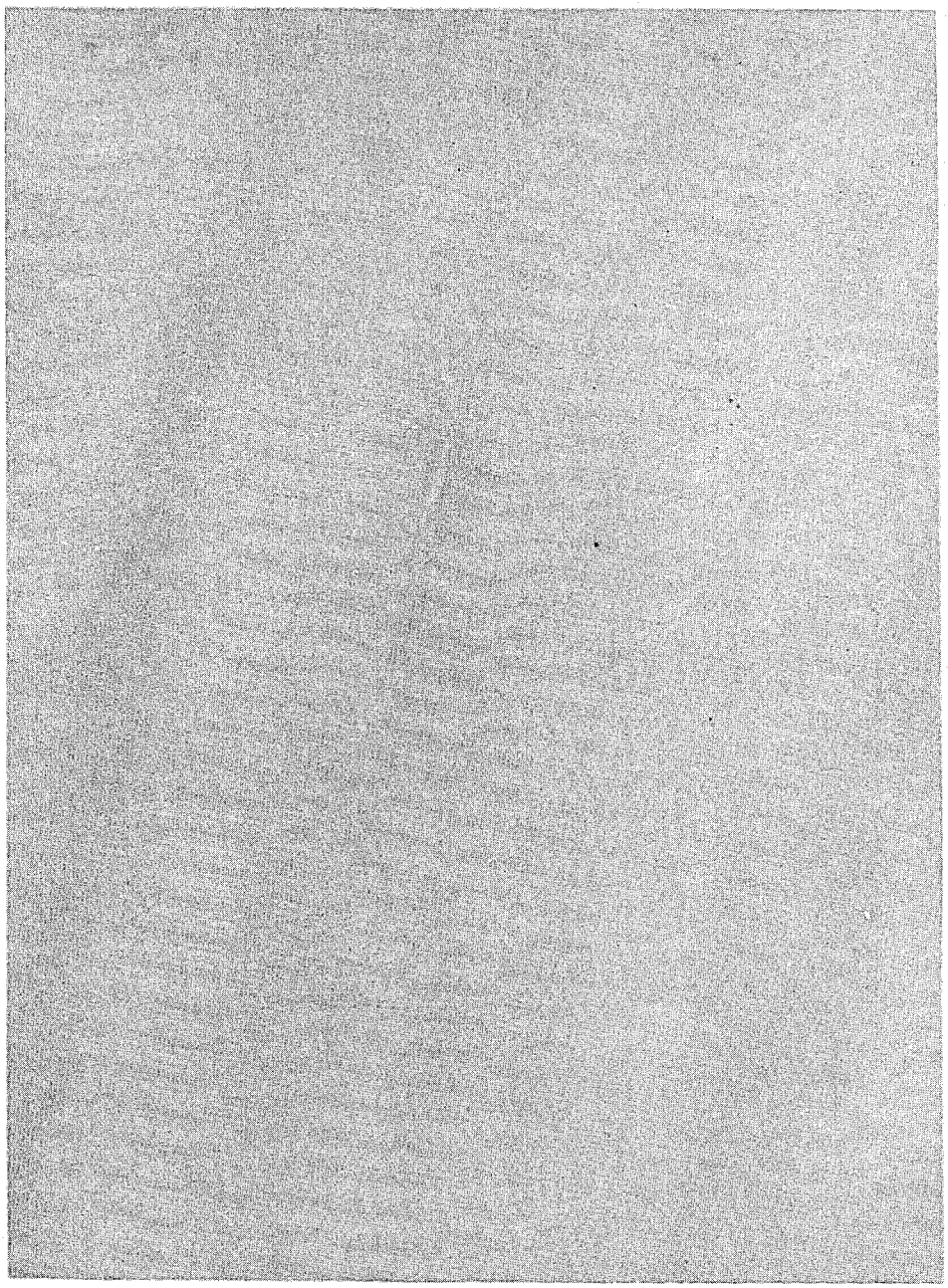

FIGURE 31 is an electron micrograph of a thin section of highly oriented deswollen tendon collagen fibrils cut from a collagen strand of the present invention and stained with chrome.

Figure 32:

FIGURE 32 is an enlarged view of a short section of regular production catgut suture being pulled apart by forces applied in the direction of the arrows.

Figure 33:
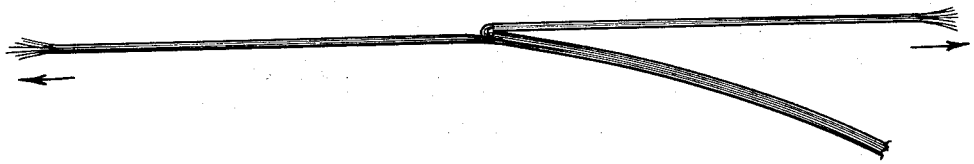

FIGURE 33 is an enlarged view of a collagen strand of the present invention being pulled apart by forces applied in the direction of the arrows.

Figure 34:
Figure 35:
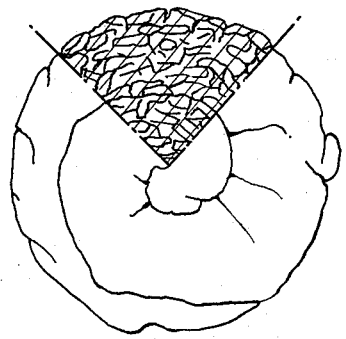

FIGURE 34 is a greatly enlarged cross-sectional view of a collagen tape prepared by the method of the present invention as it appears under the microscope; and FIGURE 35 is a greatly enlarged cross-sectional view of the collagen strand of the present invention. The fine structure that is apparent under the microscope is illustrated by the pie-shaped section of this drawing.

To assist in a better understanding of the present invention, the specification will be divided into two sections. The first part of the specification will relate to preparing a dispersion of pure swollen collagen fibrils suitable for extrusion, which forms no part of the present invention. The second part of the specification will describe a method of and apparatus for continuously spinning the pure collagen dispersion and the articles so obtained which constitutes the present invention.

THE COLLAGEN DISPERSION

The general sequence of operations in the formation of a dispersion of pure swollen collagen fibrils suitable for extrusion is shown in FIGURE 1. By the process to be described, one may disperse the native collagen fibrils and remove impurities therefrom without such denaturation or degradation of the collagen as would reduce the tensile strength of the final strand.

The raw material for the articles of this invention is mammalian tendon. Whales are a large source of collagen and whale tendon collagen is a satisfactory starting material. Pork, sheep and beef tendon are also satisfactory.

The various sections of bovine tendon are illustrated in FIGURE 2. In this figure, certain sections of the tendon have been arbitrarily designated by the letters "A" through "D." The "A" portions consist of sheaths (Annular Ligaments) which surround the two "C" sections. The "A" portions are also connected directly to the "B" tendon (the Superficial Flexor tendon). The "C" material consists of two small dense shanks which branch off the larger "D" section. These "C" portions (branches of the Deep Flexor tendon) contain a large percentage of material that does not swell in acid solutions. That section of the single shank identified by the letter "D" in FIGURE 2 (the Deep Flexor tendon) is the preferred portion of the tendon for preparing the collagen dispersion to be described, but the "B" portion may also be used.

With reference to FIGURE 1, the beef tendon (preferably the (Deep Flexor tendon) is received from the packing house in frozen condition to prevent deterioration and is thawed to permit cleaning the tendon of fat, non-collagenous protein and other extraneous matter. The cleaned tendon is then frozen in bundles resembling stacks of cordwood and sliced to a thickness of about 10 to 25 mils. Thicker slices swell slowly in aqueous acid solutions and are difficult to disperse. Thinner slices disperse readily, but the dispersion when extruded has poor tensile strength. Preferably, the tendon is sliced across the major axis as lengthwise slicing seems to result in slower swelling.

The sliced tendon is next treated with an enzyme solution to dissolve the elastin which encircles and ties together the native collagen fibres. By this treatment, substantially all of the elastin is dissolved and can be removed. Most of the fats present also separate out in this process. Proteolytic enzymes from either plant or animals sources may be employed to advantage. Pancreatin is an enzyme that is effective in removing elastin. Enzymes derived from plants, such as ficin, are also useful. Another enzyme that will perform this function is one prepared by extracting commercial malt diastase (U.S.P. IX) with water. The tendon-enzyme mixture is stored at room temperature for 15 to 20 hours. By this treatment, substantially all of the elastin is separated from the native collagen fibers.

After the enzyme treatment the tendon slices are washed with water. Soluble proteins and lipids may be removed by treating the slices with a dilute aqueous solution of a chelating agent, such as ethylenediamine tetrasodium tetraacetate. Following this treatment, the tendon slices are washed again to remove residual traces of the chelating agent.

The cleaned tendon slices at this point contain a high percentage of purified collagen associated with material that does not swell in an acid solution. The next step is to swell this collagen in an acid solution to form a homogeneous dispersion of collagen fibrils, but it is most important during this swelling step that the collagen slices not be permitted to cohere. As collagen swells, it becomes sticky, and, if the individual collagen slices are permitted to stick together, the interior of the resulting mass will not have contact with the swelling solution. Therefore, it is desirable to prevent coherence of the individual tendon slices in order to obtain a homogeneous fibril dispersion in a practical time. A dispersion kettle (see FIGURES 3 and 4) having an eccentric paddle 106 as shown in the drawings, is used to minimize lump entanglement.

In the dispersion kettle, the collagen slices are slowly stirred in an acid solution by the eccentric paddle, allowing the collagen slices to absorb the acid solution with swelling.

Temperature becomes a critical factor after addition of acid to the tendon slices as the collagen is degraded in the presence of acids at about 30° C. and above. For this reason, all processing subsequent to the acid addition should be carried out at temperatures below about 25° C.

The swelling solution may be an aqueous solution containing cyanoacetic acid or a perfluoro acid having the formula $CF_3(CF_2)_nCOOH$, in which $n$ is zero or a whole integer smaller than seven. While perfluoro acids having at least two but not more than eight carbon atoms may be used in preparing the collagen dispersion, if there are fewer than four carbon atoms in the perfluoro acid, the dispersed collagen is less resistant to degradation, and if there are more than six carbon atoms in the perfluoro acid, the water solubility of the perfluoro acid is so decreased that methanol must be added to the solution to increase the swelling by the perfluoro acid. The amount of acid present will vary with the equivalent weight of the acid and its ionization constant. In general, however, an acid content of about 0.20 percent to about 1 percent of the total weight of the solution is used. The preferred pH is 2–3.

It is reasonable to expect that with increasing solids content, a situation will eventually be reached wherein all of the available swelling fluid would be soaked up and bound in the collagen fibrils. The dispersion of swollen tendon collagen fibrils is believed to undergo a transition from a two-phase (free fluid plus swollen fibrils) to a one-phase (swollen fibrils) system at a solids concentration of about 0.73 percent to 0.82 percent. As the concentration of collagen is increased above 0.82 percent by weight, the free fluid in the continuous phase of the dispersion is imbibed by the swollen collagen fibrils and a one-phase system consisting only of swollen collagen fibrils is formed.

Thus, increasing the collagen concentration (above about 0.82 percent) results simply in a mass of swollen collagen fibrils. Such swollen collagen masses have an extremely high viscosity. When the collagen dispersion is to be used to extrude filaments, the amount of collagen solids present in the swelling solution is preferably about 0.80 percent. A dispersion of collagen fibrils that has a solids content below 0.7 percent is difficult to spin. On the other hand, a concentration of collagen fibrils greater than 0.82 percent results in a collagen mass that is very difficult to extrude. Of equal importance is the difficulty in obtaining and maintaining a homogeneous starting material when the total solids are too high. It is extremely important that a collagen fibril dispersion which is to be extruded be homogeneous, as a small change in the solids concentration of the material being extruded will result in large cross-sectional variations in the final product.

Figure 7:
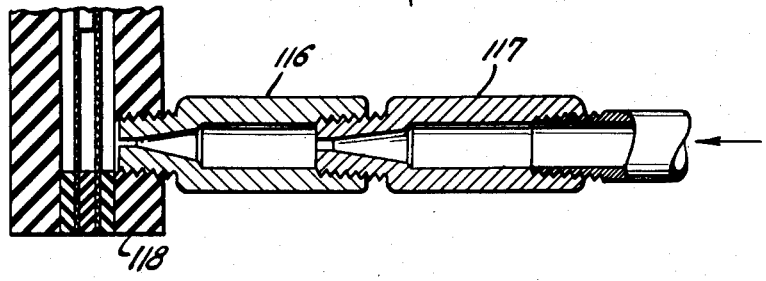
FIGURE 7 is a detailed sectional view of the homogenizing jets that are associated with the spinning machine of FIGURE 6.

After most of the swelling has taken place in the dispersion kettle (FIGURE 3), the suspension is homogenized by repeated passes through a stainless steel rotary metering pump 107 modified by milling 0.003 inch from the circumference of the gear teeth, and two stainless steel series-connected jets 108 and 109 returning to the kettle through conduit 110. The internal structure of these jets is illustrated by FIGURE 7.

Figure 8:
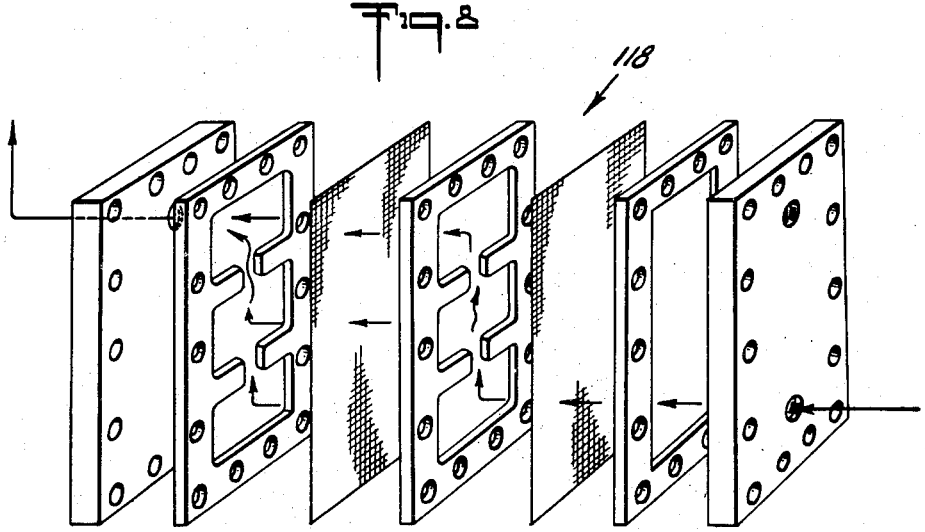
FIGURE 8 is an exploded view of a screen filter of the type used to remove non-swollen material from the collagen dispersion.

The dispersion after homogenization is filtered to remove areolar connective tissue, blood vessels of the tendon and other unswollen non-collagenous material which might tend to clog the spinnetette. This is most readily accomplished by forcing the dispersion under pressure through a leaf filter, such as shown in FIGURE 8, which retains the non-collagenous material.

The filtered collagen dispersion is then aged preferably at room temperature (about 25° C.) for a period of about 24 hours.

The preparation of a dispersion of pure swollen collagen fibrils, according to the procedure outlined above, is designed to eliminate all impurities, as any discontinuity will result in breaks in the monofilaments during the spinning process. Even minute air bubbles will cause breaks in the monofilaments and it becomes necessary, therefore, to remove all air from the dispersion just prior to use. This may be conveniently accomplished by placing the dispersion, just prior to spinning, in a large vacuum desiccator and applying a vacuum (about 15 mm. of mercury) for 2 or 3 hours. The presence in the aqueous dispersion of a liquid having a low vapor pressure, such as methanol, assists in the removal of air bubbles. Methanol is a preferred cosolvent because of its low specic gravity. As much as 50 percent by volume of methanol may advantageously replace the water in the collagen dispersion. The use of larger amounts will introduce difficulties in swelling the collagen fibrils and result in a dispersion that is difficult to homogenize and extrude. An aqueous dispersion that contains no cosolvent would require a longer time to completely deaerate under vacuum.

In order to avoid introducing extraneous air when transferring the dispersion from the desiccator to the spinning reservoir, the dispersion may be introduced into the bottom of the spinning reservoir by evacuating the reservoir as illustrated in FIGURE 1.

SPINNING THE COLLAGEN DISPERSION

The collagen dispersion may be spun either vertically or horizontally, but for purposes of illustration the spinning process will be described with reference to the vertically upward spinning machine illustrated in FIGURE 9.

It will be noted that the collagen dispersion is forced through a fixed spinnetette into an enclosed system recirculating dehydrating bath. The filaments are pulled vertically upward out of the bath by godet 101, and are stretched between godet 101 and 102. Provision is made to continuously treat the moving monofilaments with a liquid at godets 101 and 102 as shown in FIGURES 21 and 23. Godet 103 imparts additional stretch and orientation to the strand and false twisters 112 and 113 which precede godets 102 and 103 respectively round and dry the strand. The tensiometers 142 and 143 measure tension on the strand. The total span between the spinnerette and the take-up spool is preferably about 20 feet, and the distance between the surface of the spinnerette and the level at which the filaments leave the dehydrating bath is preferably about 22 inches. These devices and the processes they effect will be more evident as the description of the invention proceeds.

Figure 6:
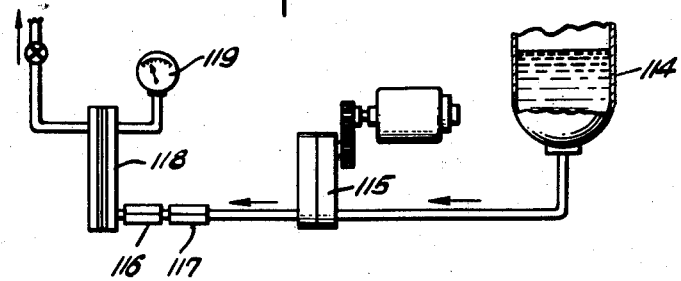
FIGURE 6 is a side elevation of a section of a spinning machine and shows an extrusion pump in series with a reservoir for the fibril dispersion, homogenizing jets and a screen filter.

Referring now to FIGURE 6, which illustrates one method of feeding the dispersion to the spinnerette, a metering pump 115 pumps a previously homogenized dispersion from the reservoir 114. On leaving the pump 115, the dispersion is homogenized by passage through nozzles 117 and 116 connected in series. These nozzles are of the type illustrated in FIGURE 7. The nozzle is attached to the inlet side of a small leaf filter 118, which removes some of the remaining non-collagenous foreign particles that might otherwise enter the spinnerette. A panel-mounted gauge 119 is connected to the filter to record pressure changes.

In FIGURE 12 there is shown a detailed view of the spinning tube and the position of the spinnerette within the circulating spin bath. The spinnerette holder 129 is preferably machined from hard-rubber stock and is fastened to the glass cylinder 120 by a fitting of the same material.

The spinnerette may be a brass plate about 1¼ inches in diameter and ¼ inch in thickness, and is illustrated in FIGURES 13, 14, 15 and 16. The spinnerette shown therein is drilled with 40 openings arranged in three concentric rings although the number and arrangement of the openings may be varied. Each opening to the spin bath is approximately 18 mils in diameter, and each opening has a 30° taper from this diameter, at a point 34 mils from the spinnerette surface, to a 3/32-inch opening at the bottom surface of the spinnerette, as shown in the enlarged sectional view of FIGURE 16.

Figure 17:
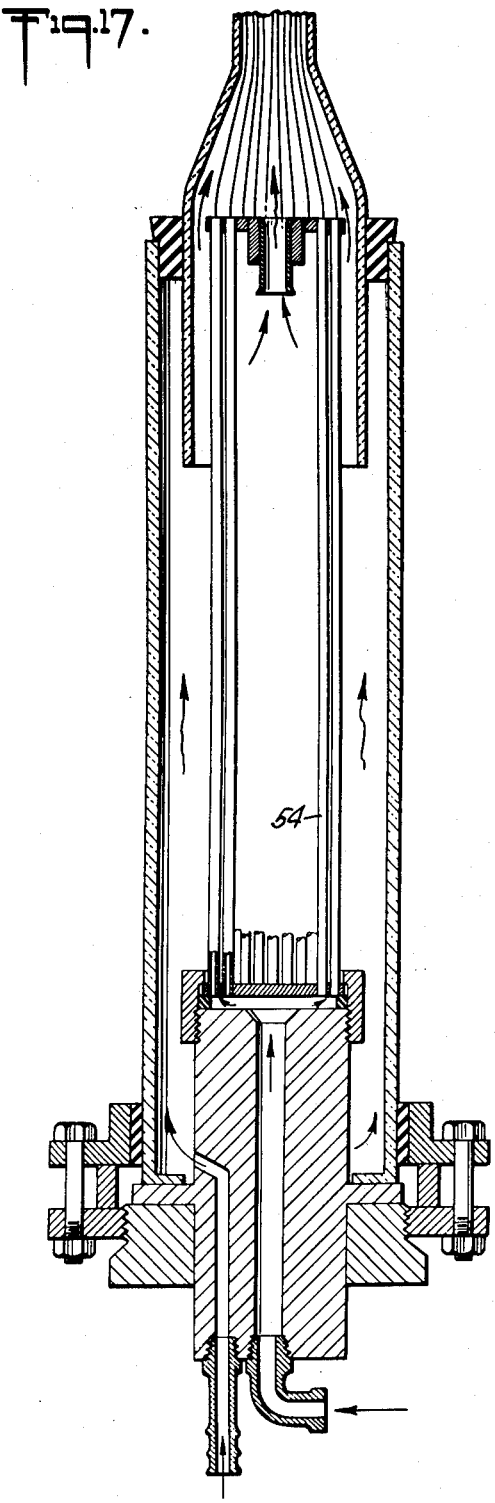
FIGURE 17 is a sectional view of a different type of spinnerette in position for vertically upward spinning.
Figure 18:
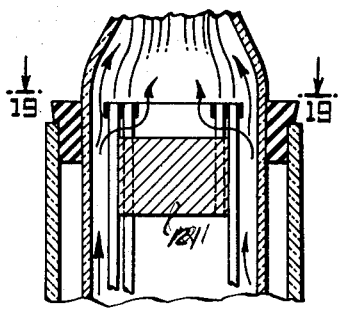
FIGURE 18 shows a modification of the spinnerette illustrated in FIGURE 17.
Figure 19:
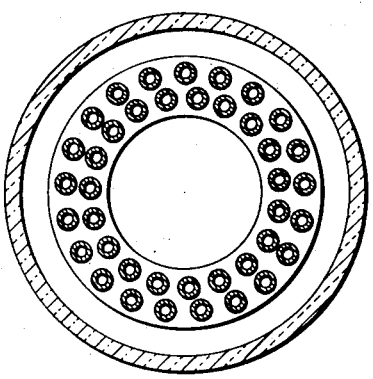
FIGURE 19 is an enlarged sectional view of the spinnerette taken on the line 19—19 of FIGURE 18.

A columnar stainless steel spinnerette having a 6-inch lead 54 to openings 18 mils in diameter, as shown in FIGURES 17, 18 and 19, can be substituted for the brass spinnerette described above. If this type of spinnerette is used, better circulation may be obtained by obstructing the central opening with a stopper or cork 121, as illustrated in FIGURE 18.

Figure 11:
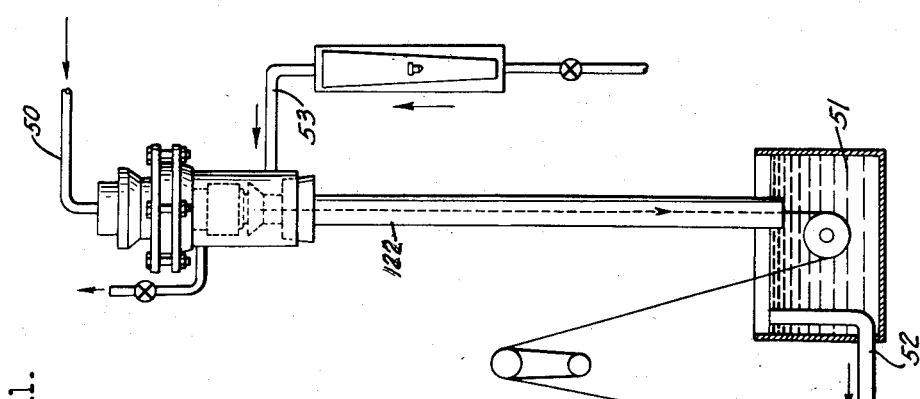
FIGURE 11 is a side elevation, partially in section, of a spinnerette and the associated dehydrating bath arranged for vertically downward spinning.

The brass plate spinnerette, however, has the advantage of lower initial cost as well as lower maintenance cost. Moreover, when using the brass plate type of spinnerette, the dehydrating bath volume may be smaller, and less line pressure is required. This type of spinnerette is adaptable to downward spinning, and FIGURE 11 shows an alternative arrangement of the spinning column which permits downward spinning of the filaments. In FIGURE 11, the collagen dispersion enters through the conduit 50 and is extruded downwardly through the spinning column 122 into the dehydrating bath 51 which overflows through the tube 52. The dehydrating bath enters the spinning column at the top through conduit 53.

Referring now to FIGURE 12, the dehydrating bath enters the spinning tube from the side and below the spinnerette and flows up the spinning column 122 cocurrent with the extruded collagen 123. The spinning column preferably has an internal diameter of ½ inch, is 22 inches in length, and is flared outwardly at an angle of 20° to an internal diameter of 1 1/16 inches at its lower end. The circulation rate of the spin bath within this column is generally about 850 cubic centimeters per minute, but may be increased to more than 1200 cubic centimeters per minute. A circulation rate of about 850 cubic centimeters per minute provides a rapid change of the bath and the upward flow helps to carry broken filaments away from the spinnerette opening and up the column. A circulation rate as low as 50 cubic centimeters per minute, however, will provide a satisfactory change of the spin bath.

Figure 20:
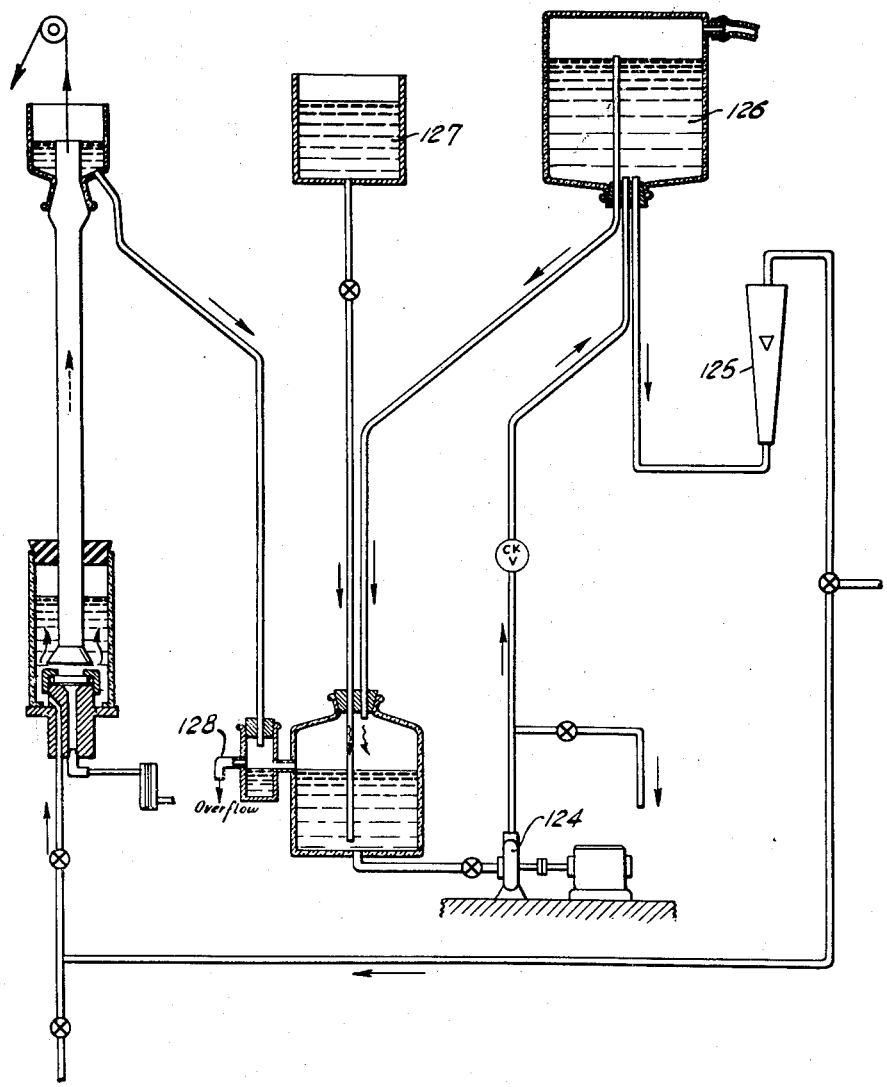
FIGURE 20 is a side elevation, partially in section, of a spinnerette and spinning tube illustrating the associated spin bath, and means for maintaining the composition of the spin bath constant.

The circulating system for the spin bath is illustrated in FIGURE 20. The spin bath is preferably circulated by a centrifuge pump 124 from reservoir 126 which may contain 4 liters of solution, originally made up by adding 0.8 milliliter of reagent grade ammonium hydroxide (28%–30% $NH_3$) and 35 grams of water to 1 liter of fresh commercial acetone. The original water content of this commercial acetone is about 5 grams per liter. For optimum results, the composition of the spin bath should be maintained as follows:

Acetone_____ 1 liter.
Ammonia_____ 120 to 140 milligrams of $NH_3$.
Water_____ 40 to 60 grams.

If less ammonia is present in the spin bath, the extruded filament is too soft when formed at the spinnerette opening and if too much ammonia is present in the bath, the filaments are brittle and cannot be stretched to obtain the desired orientation.

The water present in the spin bath has the opposite effect, in that too much water will result in an excessively soft filament, and too little water will give a brittle filament that cannot be stretched. Thus, the ammonia present in the acetone bath will compensate to some extent for the water present and vice versa.

The composition of the spin bath is quite critical since a feather-like growth will be formed at the spinnerette surface should the concentration of ammonia increase above 160 milligrams per liter. Any "feathers" that are formed will result in discontinuity and poor tensile strength in the dried and stretched strand. If the ammonia concentration falls below 100 milligrams per liter, the extruded filaments are too soft and difficulty with breakage is experienced. The composition of the spin bath may be maintained relatively constant by adding to the spin bath from the make-up reservoir 127 from 2 to about 3 liters of dehydrating solution each hour. The make-up reservoir contains double distilled acetone, to which has been added 5 cubic centimeters per liter of aqueous ammonia (about 1400 to 1500 milligrams of $NH_3$). The overflow 128 functions to maintain the total volume of the spin bath constant.

Figure 9:
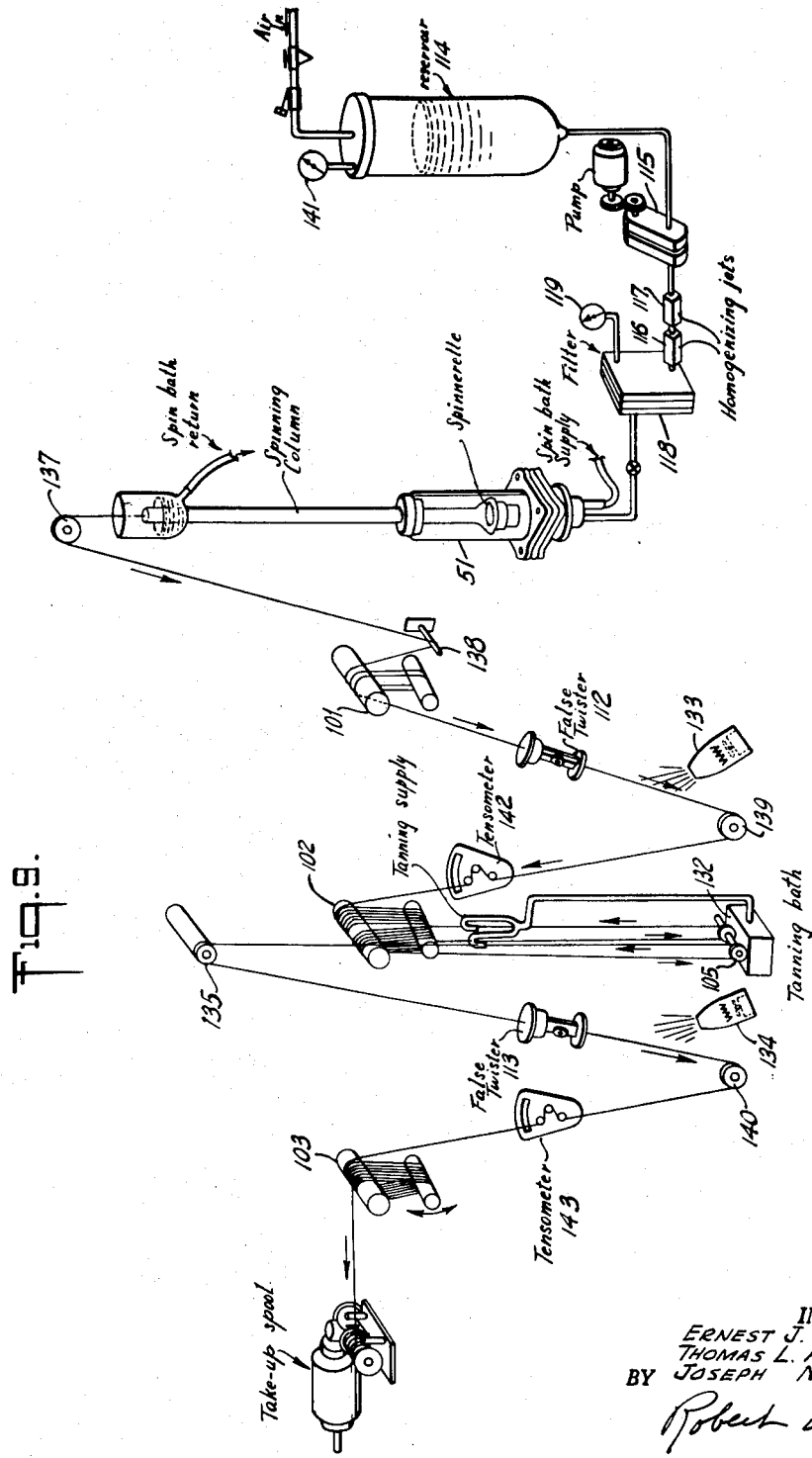
FIGURE 9 is a schematic view of a spinning machine that may be used in the manufacture of continuous collagen strands by the "direct" spinning process.

Referring now to FIGURE 9, the spun collagen is transported through the machine by three godets 101, 102 and 103, preferably of nylon, each of which is preferably 3 inches in circumference. Godet 101 is illustrated in FIGURE 21 and godet 102 in FIGURE 23. Directly below godet 101 is an auxiliary nylon roller 104, as shown in FIGURE 21. The separation of the strands on godet 101 is controlled by moving the axis of the auxiliary roller 104 wth respect to the axis of the godet (FIGURE 22). The roller 104 pivots on the hinge pin 130 and may be securely fixed in any position of adjustment by the set screw 131.

When spinning at the rate of about 2.97 cubic centimeters of 0.8 percent collagen dispersion per minute, godet 101 is preferably driven at a speed of about 10 r.p.m. At 10 r.p.m., the linear rate of spinning is about 30 inches per minute. The spun strand passes twice around godet 101, the two loops being sufficient to prevent slippage.

Godet 102 is preferably driven at 14 r.p.m. and therefore produces a 40 percent stretch in the strand between godet 101 and godet 102. The amount of stretch at this stage may be increased or decreased as desired by varying the relationship between the speeds of godet 101 and godet 102. It will be noted that the strand is wrapped around godet 102 twelve times (see FIGURE 23). This number of passes is usually required because the dry strand slips more easily. The stretching between godets 101 and 102 provides orientation of the drying strand and improves the tensile strength.

Spinning conditions may, for example, be controlled so that godet 101 is operated at 10 r.p.m., godet 102 is rotated at 14 r.p.m., and godet 103 at 15 r.p.m. Under these conditions, there is obtained, in addition to the 40 percent stretch between godets 101 and 102, another 10 percent stretch between godets 102 and 103. The overall stretch may be varied from about 20 percent to 50 percent. Since the optimum amount of stretch will result in maximum strength, the machine is operated to give a stretch somewhat less than that required to break filaments of the strand.

The moving filaments may be continuously washed and/or tanned at godet 101 or godet 102, or a two-step tanning procedure may be used by treating the filaments at godet 101 and again at godet 102. FIGURE 23 illustrates a method of contacting a united multifilament by a downward flow of tanning solution in a direction opposite to the direction of thread travel. The wetted out thread returns from a freely rotating idler wheel 132 and contacts the tanning bath in a second stage. In its wet condition, the tanned thread is stretched an additional 10 percent by the more rapidly rotating godet 103.

One problem that caused a great deal of difficulty was that of obtaining a strand having a circular cross-section. The multifilaments, as they emerge from the spin bath, are very loosely united and are approximately circular in cross-section; however, multiple passage over the circular godet surfaces, especially when the filaments are under tension, forms a ribbon-like strand. This deformation takes place most readily when the strand is wettest, as it leaves the spin bath and tanning bath.

The deformed strand from the godet may be rounded and dried by contact with a false twister of the type illustrated in FIGURES 26 and 27. This device is constructed with a freely rotating idler wheel 55 and automatically imparts a so-called false twist to the strand, a false twist being a twist whose direction on one side of a point of contact is reversed on the opposite side, thus cancelling the twist. The twisting cycle is most effective when the strand is in the wet state. When the twist backs up to the godet 101, as the wet multifilaments emerge from it, a gradual tapering effect of the strand takes place, which rounds it out. The circular shape of the strand remains after the twist is cancelled. The wringing action caused during the formation of the twist effectively dries the strand in a short space and reduces the tendency for the strand to break when subjected to stretch, thus permitting a large stretch between godets. To assist this drying action, a current of warm air from blowers 133 and 134 is preferably directed against the strand as it moves away from the false twister.

The false twisters are both operated in the range of 150 to 1000 r.p.m., and may be driven by compressed air from the nozzle 57 against turbine blades 58 as shown in FIGURE 25. In the "indirect" spinning process, an open multifilament may be obtained if the multifilament is not wet out in the bath 144, below godet 101 and the false twister is rotated at a low speed (about 200 r.p.m.) to effect drying without uniting the individual filaments. In the "direct" spinning process, the speed of the first false twister is such as to control the moisture in the strand to give the desired stretch (about 600 r.p.m.).

Referring again to FIGURE 9, it is important that the freely rotating roller 135, that precedes the false twister 113, be positioned in the machine about 44 inches above the idler roller 105. This permits the wet tanned strand to dry out somewhat, and results in an improved circular cross-section. When the strand contacts the second false twister 113, it should be sufficiently dry to avoid either deformation by the roller or reverse twist.

The tensiometers 142 and 143 shown in FIGURE 9 measure tension placed on the dry strand by godets 102 and 103. The tension effected by the godet 102 varies from 10 to 300 grams with the humidity, temperature, speed of the false twister and other operating conditions. When the operating variables are well adjusted, it is preferred to spin with a tension of between 75 and 150 grams.

Figure 5:
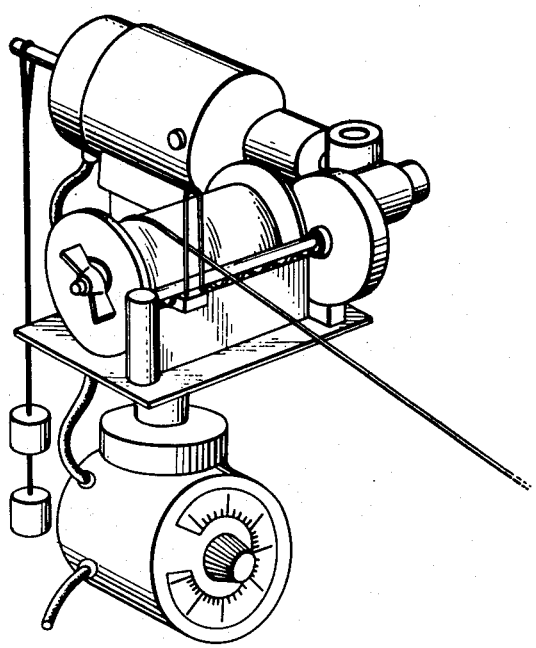
FIGURE 5 is a perspective view of a take-up spool for the dried strand.

The second stage tension on the dry strand effected by godet 103 is between 200 and 500 grams. The dried strand is removed from godet 103 by the takeup spool, illustrated in FIGURE 5, at approximately 45 inches per minute.

It has been observed that atmospheric humidity, a variable during the spinning of a strand, plays an important part in the stretch and the final tensile strength of the strand. The humidity is preferably controlled by encasing the spinning operation within the smallest practical enclosure into which air of controlled humidity may be introduced. Superior monofilaments are spun when the humidity is controlled between 30 and 60 grains of moisture per pound of dry air. Multifilaments may be spun when the humidity is less than 20 grains per pound. When the humidity is above 60 grains of moisture per pound of dry air, the filaments are soft and it is difficult to maintain spinning tension.

Figure 10:
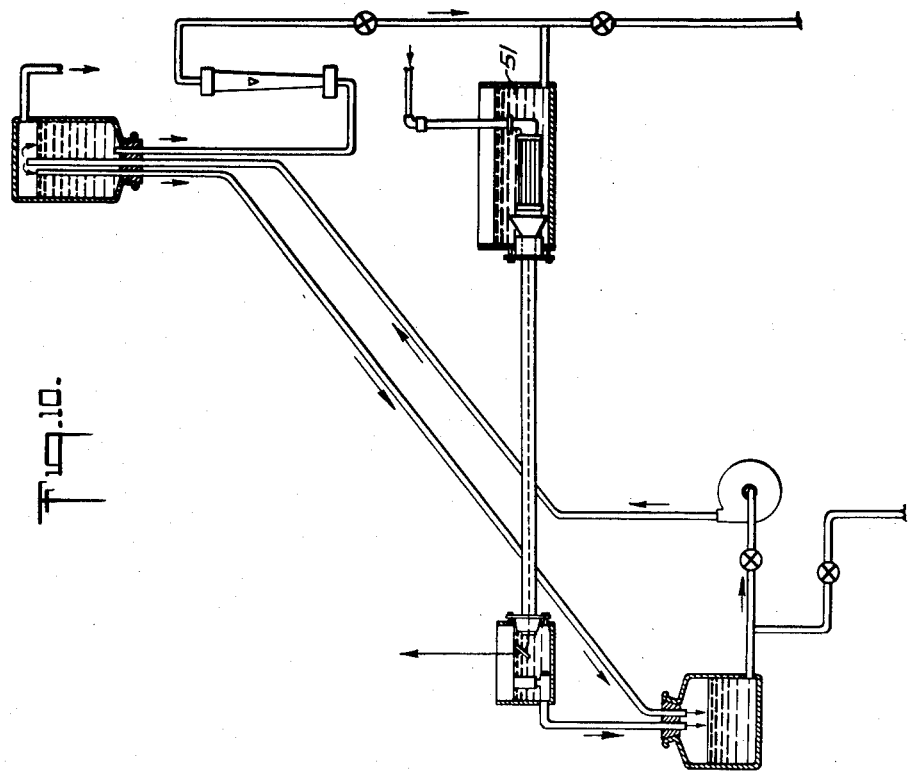
FIGURE 10 is a side elevation, partially in section, of a spinnerette arranged for the horizontal spinning of collagen multifilaments or strands. This figure also illustrates the circulation of the dehydrating bath.

It will be realized of course that although a vertically upward spinning process has been described above, the same principles will apply to vertically downward or horizontal spinning. Thus, with the spin bath in a horizontal position as shown in FIGURE 10, collagen dispersions may be spun with practically no modification of the operating conditions.

The "direct" spinning of a dispersion of swollen collagen fibrils to produce a unitary strand of outstanding properties will be illustrated by the examples, Examples I through IX. Throughout the specification, all quantities are expressed in parts by weight unless otherwise indicated.

*Example I.—Preparation of Collagen Dispersion*

That portion of the Deep Flexor tendon of cattle designated in FIGURE 2 as the "D" section is cleaned of fat, non-collagenous protein, and other extraneous matter, and is sliced on an electric meat-slicing machine (rotary knife) in the frozen condition. The tendon sections are sliced perpendicularly to their longitudinal axis to a thickness of about 15–25 mils.

The sliced tendon is next treated with an enzyme solution to dissolve elastin. The enzyme solution is prepared by agitating 40 parts of malt diastase with 400 parts of water for 10 minutes. The homogeneous dispersion is centrifuged at 2000 r.p.m. for 20 minutes, and the clear aqueous solution from the centrifuging step is vacuum filtered. The filtrate, which is usually slightly acid, is adjusted to pH 7 with a few drops of dilute sodium hydroxide. Distilled water is then added to the neutral enzyme solution to bring the total volume up to 1200 parts. Four hundred parts of the sliced tendon is immersed in this solution, which is then covered with a layer of toluene to prevent mold growth. This tendon-enzyme mixture is incubated at 37.5° C. overnight (15–20 hours).

After incubation, the tendon slices are washed 3 or 4 times by decantation with distilled water and then treated with 1000 parts of water containing 4 grams of "Versene" (ethylene diamine tetrasodium tetraacetate). The tendon-"Versene" mixture is incubated for approximately 2 hours at 37.5° C. to remove soluble proteins and lipids. Following this "Versene" treatment, the pH should again be adjusted to 7 if necessary as the tendon slices are easier to handle (less swelling and hydration) in a neutral solution. The tendon slices are again washed by decantation with 5 to 6 changes of distilled water.

The swelling solution is 50% aqueous methanol containing about 0.35%, based on the total solvent weight, of perfluorobutyric acid. In general, the collagen dispersion is easy to process at about 1% calculated solids concentration and the amount of acid-swelling solution may be readily calculated from the weight and solids content of the tendon used. The acid solution is prepared by mixing 6000 parts of methanol with 3987 parts of distilled water and adding 42 parts of perfluorobutyric acid.

Figure 3:
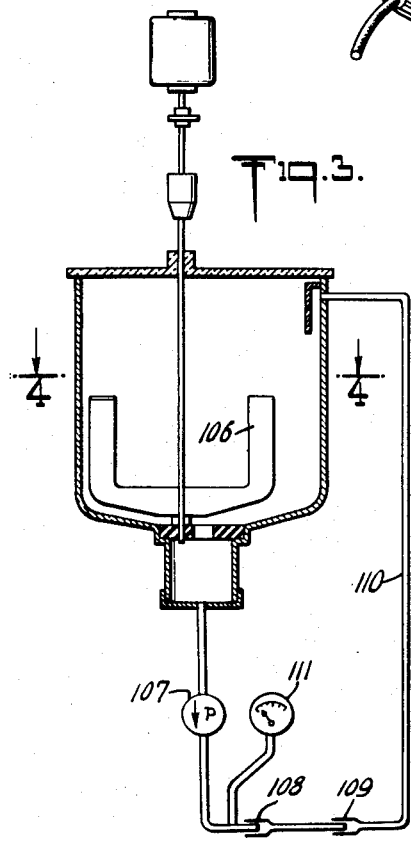
FIGURE 3 is a sectional view of a kettle that is used to prepare a homogeneous dispersion of collagen fibrils.
Figure 4:
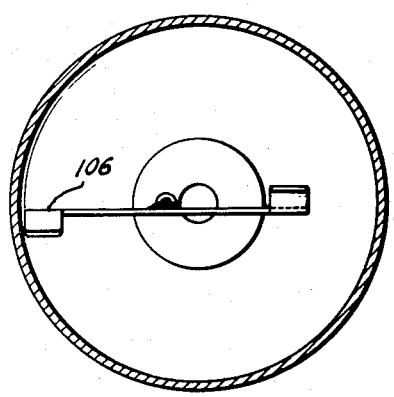
FIGURE 4 is a sectional view of the dispersion kettle along the line 4—4 of FIGURE 3.

The acid aqueous methanol solution is cooled to below 25° C. and is added to a dispersion kettle of sufficient capacity as illustrated in FIGURE 3, and the processed collagen slices are added to the dispersion kettle while rotating the stirrer at about 60 r.p.m. It is important that the remaining steps in the process be carried out at temperatures below 25° C. and that the temperature of the collagen dispersion not be allowed to exceed this temperature.

Stirring is continued for 3 hours, during which time the individual collagen slices are swollen. The dispersion is then homogenized by repeated passes through the stainless steel rotary metering pump 107 described above and the stainless steel series-connected jets (108 and 109) having orifices of 30 mils and 40 mils. During the homogenization, the stirrer in the dispersion kettle is operated intermittently.

The pressure on the high pressure side of the homogenization jets falls to 70 pounds per square inch and remains constant after 3.5 hours, indicating substantially complete homogenization. The dispersion is then forced through 50- and 40-mil jets into a leaf filter containing 3 screens of #316 stainless steel. These screens are separated by 1/8-inch spacers and decrease in mesh size so that the dispersion first passes a 14 mil screen, then a 9-mil screen and finally a 4-mil screen. During the filtration step, the pressure on the filter is maintained below 40 pounds per square inch at all times.

FIGURE 30 is an electron micrograph of a whole mount of acid swollen tendon collagen fibrils prepared by the procedure described above. The swollen collagen fibrils are stained with phosphotungstic acid; magnification 18,400 times.

The dispersion of Example I may be dehydrated under mild conditions to recover highly purified collagen fibers. The dispersion may be extruded as described in subsequent examples to form collagen multifilament, tapes and strands.

*Example II.—Spinning the Collagen Dispersion*

The collagen dispersion described in Exmaple I above is deaerated under vacuum for 4 hours, aged for 31 hours at 25° C. and 16 hours at 5° C. and is then spun in the vertically upward spinning machine illustrated in FIGURE 9. The pressure in the dispersion reservoir as indicated by the pressure gauge 141 is 15 pounds. The pump 115 is operated at 9.5 r.p.m. to extrude 2.82 milliliters of the dispersion each minute. The pressure at the filter as measured by the guage 119 is approximately 10 pounds. The acetone dehydrating bath is continuously circulated to the spinning column at the rate of about 900 milliliters per minute. During this run the ammonia content of the dehydrating bath is maintained at 138 milligrams per liter and the water content is 53 grams per liter.

The speed of the godets 101, 102 and 103 is maintained at 6.67, 9.00 and 9.33 r.p.m., respectively. The false twisters 112 and 113 are both rotated at 600 r.p.m. The strand is continuously tanned at godet 102 by contacting an aqueous solution containing 4 milliliters of 40% aqueous formaldehyde and 1 gram of aluminum ammonium sulfate per liter, which solution is circulated at the rate of 50 cubic centimeters per minute (25 cubic centimeters per minute through each jet). The blower 133 is adjusted to maintain a tension of 45 to 50 grams as indicated by the tensiometer 142. The blower 134 is operated in a manner such that the tension indicated by the tensiometer 143 is about 190 grams. The relative humidity is maintained at 26% throughout the spinning.

The spinning machine operates continuously and without any difficulties, such as broken strands or "feather" formation, under these conditions. The rate of takeup at the spool is about 42 inches per minute. At the end of 6 hours continuous spinning, about 1300 linear feet of collagen strand (size 5/0, 244 denier) is collected.

Random samples are cut from different sections of this continuous strand. Each sample is 5 feet in length. These samples are packaged in tubes containing 90% isopropyl alcohol and 10% water by volume and the samples sterilized by electron beam irradiation ($3 \times 10^6$ rep's). The straight tensile strength (dry) and knot strength (both wet and dry) for these sterile samples is reported in Table 1.

TABLE 1

| Dry Straight | Dry Knot | Wet Knot | Papain Digestion | Hot Water Digestion |
|---|---|---|---|---|
| 2.02 | 1.12 | 1.00 | 1.1 | 3.7 |
| 1.99 | 1.19 | 0.99 | 1.4 | 3.2 |
| 2.16 | 1.29 | 0.99 | 1.5 | 3.4 |
| 2.16 | 1.32 | 0.97 | 1.2 | 3.7 |
| 1.89 | 1.34 | 0.87 | 1.3 | 3.6 |
| 1.75 | 1.32 | | | |
| | 1.32 | | | |

In Table 1, the dry straight tensile strength (6 breaks reported in pounds) is given in column 1. The dry knot tensile strength (7 breaks reported in pounds) is given in column 2. The wet knot tensile strength (5 breaks reported in pounds) is given in column 3. The wet knot tensile strength is measured by immersing a strand about 1 foot in length in distilled water for 5 minutes, tying a knot near the center of the strand and breaking the strand at the knot. Column 4 gives the papain digestion time. This is the time in hours required for a 7-inch strand tied to form a loop to go to 20 gram strength at 38° C. in a solution of papain containing 3 grams of the enzyme in 100 milliliters of a buffered solution containing 7.6 grams of thiourea. Four milliliters of 5% sodium cyanide are added to 96 milliliters of the above buffered solution of papain just prior to use. The final pH of this solution is 7.2. Column 5 gives the hot water digestion time. This is the time in minutes required for a 7-inch strand, tied to form a loop, to go to 20 grams strength at 100° C. when immersed in a solution of water buffered at a pH of 1.35.

From Table 1, it may be calculated that the average dry straight tensile strength is 2.00 pounds. The average dry knot tensile strength is 1.27 pounds. The average wet knot tensile strength is 0.95 pound. These values correspond to a dry straight tensile strength of 3.72 grams per denier, a dry knot tensile strength of 2.36 grams per denier and a wet knot tensile strength of 1.79 grams per denier.

*Example III*

The collagen dispersion of Example I, after aging for 24 hours at room temperature and 47 hours at 5° C. is spun by the process described in Example II above. The pump speed is 8.5 r.p.m., and the concentration of ammonia and water in one liter of the acetone bath is 130 milligrams and 51 grams, respectively. The flow rate of the acetone bath is 900 cubic centimeters per minute. The godets are operated at 6.7, 9.0 and 9.3 r.p.m. The false twisters are both operated at 600 r.p.m. The formaldehyde tanning bath of Example II is used and the tension preceding godets 102 and 103 is 68 grams and 190 grams, respectively. Under these conditions, the sterile strand (denier of 217) has a dry knot tensile strength of 3.05 grams per denier and a wet knot tensile strength of 2.17 grams per denier.

*Example IV*

The dispersion of Example I, after aging 88 hours at room temperature and 448 hours at 5° C. is spun by the process described in Example II. The filaments are, however, wet out with a chromium tanning solution in the bath 144 below godet 101, as illustrated in FIGURE 21.

A chromium stock solution is prepared by dissolving a mixture of 171 milliliters of concentrated sulfuric acid, 51.1 grams of potassium dichromate, and 85 grams of sodium metabisulfite in water. This solution is made up to 1 liter of stock solution with water. The stock solution analyzes 27.6 milligrams of chromium per milliliter.

The chromium tanning solution used in bath 144 is made up by diluting 25 milliliters of the chromium stock solution with distilled water to a total volume of 100 milliliters. The pH of the chromium tanning solution is about 3.7. The formaldehyde tanning bath described in Example II is used between godet 102 and godet 103. The spinning conditions are as follows:

Pump speed_____ 10 r.p.m.
Filter pressure (gauge 119)_____ 10.5 pounds.
Ammonia in dehydrating bath_____ 126 milligrams.
Water in dehydrating bath_____ 51 grams per liter.
Flow rate in dehydrating bath_____ 900 cubic centimeters per min.
Godet speeds:
 101=6.7, 102=9.1; 103=9.4.
Speed of false twisters___ 600 r.p.m.
Tension:
 35–38 grams before godet 102. 160 grams before godet 103.

The strand so obtained is sterilized as described in Example II. Random 5-foot lengths (denier of 252) are tested for wet straight tensile strength and average 2.88 grams per denier.

The papain digestion times, as determined by the test described in Example II above, is 3.5, 2.9, 4.0, 2.9 and 3.2 hours on the 5-random samples.

The hot water digestion time, as determined by the test described in Example II, is 5.7, 5.7 and 5.7 minutes on three random samples.

Other random samples of this product (denier of 252) have a dry straight tensile strength of 4.3 grams per denier, a dry knot tensile strength of 2.2 grams per denier and a wet knot strength of 1.9 grams per denier.

The dry tensile strength in pounds on 7 random samples of this product is 2.50, 2.55, 2.28, 2.33, 2.35, 2.40 and 2.44. The average is 2.41 pounds and the variation is 0.27 pound ($\pm 5.5\%$).

*Example V*

The dispersion of Example I is aged for 173 hours at room temperature and 43 hours at 5° C., and is spun by the process described in Example II above. The spinning conditions are as follows:

Pump speed_____ 9.5 r.p.m.
Ammonia in dehydrating
  bath_____ 120 milligrams per liter.
Water in dehydrating
  bath_____ 50 grams per liter.
Flow rate in dehydrating
  bath_____ 900 cubic centimeters per min.
Godet speed:
  101=10, 102=13.5, 103=14.
False twisters_____ 600 r.p.m.
Tension:
  60 grams before godet 102. 250 grams before godet 103.

The tanning procedure is identical to that described in Example II and the relative humidity during spinning is 49%.

The strand so obtained is very uniform in diameter, the diameter of 10 random samples being 6.4, 6.9, 6.8, 6.5, 6.1, 6.6, 6.4, 6.8, 6.2 and 6.6 mils. The average diameter is 1.65 mils ($\pm 0.4$ mil).

The denier uniformity of 6 random strands is 238, 238, 238, 238, 241 and 238 denier.

TABLE 2

| Dry Straight | Dry Knot | Wet Knot | Papain Digestion | Hot Water Digestion |
|---|---|---|---|---|
| 2.40 | 1.13 | 1.22 | 0.5 | 3.2 |
| 2.44 | 1.13 | 0.92 | 0.5 | 3.2 |
| 2.45 | 1.24 | 0.85 | 0.5 | 3.1 |
| 2.51 | 1.24 | 0.85 | | |
| 2.52 | 1.33 | 0.84 | | |
| 2.57 | 1.35 | 0.75 | | |
| 2.66 | | 0.76 | | |

In Table 2, the dry tensile strength in pounds of random electron beam sterilized strands of this example is listed in column 1. Column 2 of this table gives the dry knot strength in pounds and column 3 gives the wet knot strength in pounds. Columns 4 and 5 give the papain and hot water digestion as described in Example II above.

From Table 2, it may be calculated that the average dry straight tensile strength is 2.51 pounds. The average dry knot tensile strength is 1.24 pounds. The average wet knot strength is 0.89 pound. As these strands average 238 denier, the average dry straight tensile strength is 4.78 grams per denier; the average dry knot strength is 2.37 grams per denier; and the average wet knot strength is 1.70 grams per denier.

*Example VI*

The portion of the Deep Flexor tendon of young steers described in Example I is cleaned of fat, non-collagenous protein and other extraneous matter and is sliced perpendicularly to the longitudinal axis to a thickness of about 15–20 mils. The analysis for total solids on an aliquot sample of tendon slices is 35.8%.

Fifteen hundred parts of the tendon slices (537 parts of dry solids) are treated with 15,000 parts of a solution containing 15 parts of ficin, 3.63 parts of the disodium salt of ethylenediamine tetraacetic acid and 1.95 parts of ethylene diamine tetrasodium tetraacetate. The pH of this solution is 5.1 before addition of the tendon slices; after the slices are added, the pH of the enzyme solution is 6.3. After standing for 17 hours at room temperature (76° F.), the enzyme solution is decanted and the slices agitated with 15,000 parts of water to which 50 parts of 30% hydrogen peroxide are added. The hydrogen peroxide solution is decanted from the tendon slices after about 20 minutes.

The swelling solution is made by adding 148.1 parts of perfluorobutyric acid to a mixture of 17,019 parts of water and 24,132 parts of methanol. The perfluorobutyric acid amounts to 19.5% of the weight of the dry tendon solids and is 0.264% of the total weight. The calculated dry solids amount to 1.1% of the total weight (solids and swelling solution).

The drained tendon slices are added to the perfluorobutyric acid swelling solution cooled to 20° C., and the solution is agitated for 1.5 hours by bubbling air through the mixture. The mixture is then agitated for 1 hour at 40 r.p.m. while maintaining the aqueous acid methanol solution below 25° C. The suspension of swollen tendon slices is then homogenized by pumping the suspension through a ½-inch tube.

Because the viscosity of the dispersion so obtained (about 1.0% solids) is too high for convenient processing, the total solids are reduced to about 0.8% by adding 5,400 parts of water, 5,400 parts of methanol and 9.7 parts of perfluorobutyric acid. The diluted dispersion is then pumped through ⅛-inch jets.

The dispersion is next pumped through a 60-mil jet and then forced through a 50-mil jet. Finally, the dispersion is forced through 40-mil jets (two complete passes). The temperature of the dispersion is maintained below 25° C., throughout the homogenization step.

The dispersion so obtained is stored overnight at 23° C., without agitation. The following morning, the dispersion is agitated for ½ hour at 40 r.p.m. and is then passed through a leaf filter containing 15-mil, 9-mil and 5.5-mil screens. During this filtration step, the pressure on the filter does not exceed 40 pounds per square inch. The dispersion from the filter (pH 2.80) is deaerated under vacuum. The dispersion is spun by the procedure described in Example II, into a methyl ethyl ketone spin bath containing 8 milliliters of reagent grade ammonium hydroxide (assaying 28–30% $NH_3$) in 10 liters of methyl ethyl ketone. The pump is operated at 8.9 r.p.m. to extrude about 2.64 milliliters of the dispersion per minute.

In this example, a chromium tanning solution prepared as described in Example III is applied by the bath 144 beneath godet 101. The tanning bath 132 contains a formaldehyde tanning solution prepared by adding 8 milliliters of 40% formaldehyde and 20 milliliters of a 10% by weight solution of aluminum ammonium sulfate to 1 liter of water and diluting with water to a final volume of 2 liters.

The methyl ethyl ketone dehydrating bath is continuously circulated through the spinning column at the rate of about 946 milliliters per minute. The ammonia content of the dehydrating bath is 43 milligrams per liter and the water content is 12 grams per liter.

The speed of godets 101, 102 and 103 is maintained at 6.7, 9.0 and 9.4 r.p.m. respectively. This results in a stretch of 35% between godets 101 and 102 and an over-all stretch of 40% between godets 101 and 102. The false twisters are both rotated at 800 r.p.m. The tension between godets 101 and 102 is about 10 grams, and the tension between godets 102 and 103 is about 70 grams.

The relative humidity is maintained at 21–24% throughout the spinning. After the machine has been spinning for 1 hour, a 20 minute sample is taken.

Random 1-foot lengths from this sample are placed in tubes containing 90% isopropyl alcohol and 10% water by volume and the samples are sterilized by electron beam irradiation ($3 \times 10^6$ rep's). The weight of a 10-foot sample conditioned for 4 hours at a relative humidity of 40% is 71 milligrams, which corresponds to a denier of 208. The physical constants of the strand obtained as described in this example are summarized in Table 3.

TABLE 3

| Dry Straight | Dry Knot | Wet Knot | Papain Digestion | Hot Water Digestion |
|---|---|---|---|---|
| 1.78 | 1.00 | 0.98 | 7.4 | 6.4 |
| 1.82 | 1.02 | 0.92 | 7.0 | 6.9 |
| 1.87 | 0.91 | 0.90 | 8.0 | 6.5 |
| 1.85 | 0.95 | 0.95 | | |
| 2.00 | 0.91 | 0.77 | | |
| 2.00 | 0.88 | 0.79 | | |
| | 0.87 | | | |

In Table 3, the dry tensile strength in pounds of random electron beam sterilized strands of this example is listed in column 1. Column 2 of this table gives the dry knot strength in pounds and column 3 gives the wet knot strength in pounds. Columns 4 and 5 give the papain and hot water digestion as described in Example II above.

From Table 3, it may be calculated that the average dry straight tensile strength is 1.88 pounds. The average dry knot tensile strength is 0.95 pound. The average wet knot tensile strength is 0.88 pound. These values correspond to a dry straight tensile strength of 4.1 grams per denier, a dry knot tensile strength of 2.07 grams per denier, and a wet knot tensile strength of 1.92 grams per denier.

*Example VII*

By the method described in the preceding example, 1500 parts of cleaned tendon slices (thickness 10 mils) are treated with 15,000 parts of an aqueous solution (pH 6.0 containing 3 parts (0.2% of ficin, 3.63 parts of the disodium salt of ethylenediamine tetraacetic acid and 1.95 parts of ethylenediamine tetrasodium tetraacetate. The tendon slices analyze 35.3% by weight dry solids; total weight of tendon solids on a dry basis is 529.5 grams.

After standing 17 hours at room temperature, the ficin solution is decanted away from the slices and the slices are stirred for 20 minutes with 1500 parts of water containing 50 milliliters of 30% hydrogen peroxide. The pH of this solution is 6.0–6.3 after the slices are added. The hydrogen peroxide solution is decanted; the tendon slices are drained and 29,150 parts of methanol; 22,079.5 parts of water and 156.3 parts of perfluorobutyric acid are added. The perfluorobutyric acid added amounts to 19.5% of the weight of the dry solids, or 0.266% of the total weight of the mixture. The mixture is agitated with a paddle for 1 hour, while maintaining the temperature below 25° C.

The swollen tendon slices are pumped through a ½-inch pipe, and the cooled dispersion is then pumped through a ⅛-inch orifice, a 60-mil orifice and a 50-mil orifice. Finally, the dispersion is passed twice through a 40-mil orifice. The dispersion is stored overnight at 23° C., and is then filtered through a leaf filter containing 15-, 9- and 5.5-mil screens. The filtration pressure does not exceed 30 pounds per square inch and the temperature is held throughout at 15–23° C. The air is removed from this dispersion under vacuum, the final pH being 2.75. This dispersion analyzes 0.81% solids.

After aging for 72 hours at 78° F., this dispersion is spun as described in the preceding example into a methyl ethyl ketone dehydrating bath. The pump speed is 9.5 r.p.m., and the concentration of ammonia and water in the methyl ethyl ketone bath is 79 milligrams and 48.2 grams per liter, respectively. The flow rate of the methyl ethyl ketone bath is 946 milliliters per minute. The godets are operated at 6.7, 9.0 and 9.4 r.p.m., thus producing a 35% stretch between godets 101 and 102 and a 40% stretch between godets 101 and 103. The false twisters are both operated at 800 r.p.m., and the tension preceding godets 102 and 103 is 10 grams and 200 grams, respectively. The chrome tanning bath and the formaldehyde tanning bath are used exactly as described in the preceding example. Under these conditions, a 20-minute sample taken after 1½ hours of spinning (humidity 27%, temperature 78° F.) is packaged in tubes as described in Example II and sterilized by electron beam irradiation. A 10-foot length of this product, conditioned at a relative humidity of 20%, weighs 82 milligrams (denier 241). The physical constants of the strand obtained as described in this example are summarized in Table 4.

TABLE 4

| Dry Straight | Dry Knot | Wet Knot | Diameter |
|---|---|---|---|
| 2.45 | 1.01 | 1.02 | 6.6 |
| 2.40 | 1.15 | 0.98 | 6.5 |
| 2.40 | 1.19 | 1.00 | 6.6 |
| 2.38 | 1.20 | 1.02 | 6.7 |
| 2.10 | 1.26 | 0.98 | 6.6 |
| 2.17 | 1.32 | 1.07 | 6.7 |
| 1.47 | 1.52 | | 6.4 |
| | | | 6.4 |
| | | | 6.5 |
| | | | 6.4 |

In Table 4, the dry tensile strength in pounds of random electron beam sterilized strands of this example is listed in column 1. Column 2 of this table gives the dry knot strength in pounds and column 3 gives the wet knot strength in pounds. Column 4 gives the diameter of the strand in mils.

From Table 4, it may be calculated that the average dry straight tensile strength is 2.20 pounds. The average dry knot tensile strength is 1.24 pounds. The average wet knot tensile strength is 1.01 pounds. These values correspond to a dry straight tensile strength of 4.14 grams per denier, a dry knot tensile strength of 2.33 grams per denier and a wet knot tensile strength of 1.90 grams per denier.

*Example VIII*

Twenty-four hundred parts of cleaned tendon of the type described in Example I sliced to a thickness of 23 mils are treated with 24,000 parts of an aqueous solution containing 24 parts (0.1%) ficin and 9.98 parts (0.001 M) of ethylenediamine tetrasodium tetraacetate. The tendon slices analyze 37.1% total solids, equivalent to 890.4 parts on a dry weight basis. The pH of the enzyme solution is 6.2. After standing for 17 hours at room temperature, the enzyme solution is decanted and the tendon slices are stirred with 24,000 parts of water containing 80 parts of 30% hydrogen peroxide. The hydrogen peroxide solution is drained off and the tendon slices are added to an aqueous methanol solution of cyanoacetic acid made up by adding 51,354.8 parts of methanol and 378 parts of cyanoacetic acid to 49,085.2 parts of water. The amount of cyanoacetic acid in this solution is equivalent to 0.5 mole of acid for each 100 parts of dry solids and the tendon solids amount to 0.86% by weight of the total mixture. The tendon slices are agitated with this acid aqueous methanol mixture for 3 hours at 80 r.p.m. with cooling. The mixture is then circulated through a ½-inch pipe for 1 hour, through ⅛-inch jets for another hour, and through 60-mil jets for ½ hour. The dispersion is then filtered through a leaf filter containing 15-, 9- and 5.5-mil screens and deaerated under vacuum. The pH of this dispersion is about 2.8.

The dispersion is spun by the process described in Example II into an acetone dehydrating bath. The concentration of ammonia and water in 1 liter of the acetone bath is 135 milligrams and 41 grams, respectively. The pump is operated at 9.4 r.p.m. to extrude about 2.76 milliliters of the dispersion per minute. The flow rate of the acetone bath is 758 milliliters per minute. The godets are operated at 6.7, 8.7 and 9.0 r.p.m., giving a stretch between godets 101 and 102 of 30% and a stretch between godets 102 and 103 of 5%. The false twisters are both operated at 900 r.p.m.

A chromium stock solution is prepared by dissolving 1680 grams of chromic sulfate in 2 liters of water and adding water to a total volume of 8 liters. To this solution is added 680 milliliters of 5 N sodium hydroxide with stirring. Water is then added to a final volume of 20 liters. This stock solution, which analyzes 25% chromic oxide, is diluted with an equal volume of water to obtain the chromium tanning solution for use in the tanning bath 144 below godet 101. The formaldehyde tanning solution in bath 132 below godet 102 is replaced with water.

Ten feet of the product spun by this method weighs 85 milligrams (250 denier). The strand of this example, when sterilized and tubed by the method described above, has the following physical characteristics:

TABLE 5

| Dry Straight | Dry Knot | Wet Knot | Papain Digestion | Hot Water Digestion |
|---|---|---|---|---|
| 2.20 | 1.29 | 1.26 | 2.4 | 7.3 |
| 2.15 | 1.27 | 1.17 | 2.6 | 7.3 |
| 2.22 | 1.14 | 1.23 | 2.5 | 7.3 |
| 2.26 | 1.03 | 1.27 | | |
| 2.19 | 1.01 | 1.31 | | |
| 2.10 | 1.14 | 1.12 | | |
| 2.07 | 1.17 | 1.24 | | |

In Table 5, the dry tensile strength in pounds of random electron beam sterilized strands of this example is listed in column 1. Column 2 of this table gives the dry knot strength in pounds and column 3 gives the wet knot strength in pounds. Columns 4 and 5 give the papian and hot water digestion as described in Example II above.

From Table 5, it may be calculated that the average dry straight tensile strength is 2.18 pounds. The average dry knot tensile strength is 1.15 pounds. The average wet knot tensile strength is 1.23 pounds. These values correspond to a dry straight tensile strength of 4.00 grams per denier, a dry knot tensile strength of 2.12 grams per denier, and a wet knot tensile strength of 2.26 grams per denier. The strand of this example is very uniform in diameter, the diameter of ten random samples being 6.1, 6.5, 6.6, 6.5, 6.6, 6.5, 6.6, 6.5, 6.7, 6.6 mils.

*Example IX*

Twenty-four hundred parts of the tendon described in Example I are sliced to a thickness of .23 mils. This is equivalent to 885.6 parts of tendon slices (36.9% solids). The tendon slices are treated with 24,000 parts of an aqueous solution containing 24 parts of ficin and 9.98 parts (0.001 M) of ethylenediamine tetrasodium tetraacetate. The mixture is permitted to stand overnight at 24° C. The enzyme solution is then removed by decantation and the enzyme-treated slices are agitated with 24,000 parts of water containing 80 parts of 30% hydrogen peroxide. After ½ hour, the hydrogen peroxide solution is drained from the enzyme-treated slices and the slices are added to a solution of cyanoacetic acid containing 376.4 parts of cyanoacetic acid in 48,701.1 parts of water and 51,045.5 parts of methanol. The mixture is agitated for 3 hours at 80 r.p.m. and is then circulated for 1 hour though a ½-inch pipe. The dispersion is circulated for another hour through a ⅛-inch jet and the homogenization is completely accomplished by circulating an additional ½ hour through a 60-mil jet. This dispersion is filtered under pressure of 40 pounds per square inch through a leaf filter containing 15-, 9- and 5.5-mil screens and deaerated under vacuum.

The collagen dispersion (about 0.79% solids) is aged for 144 hours at room temperature and spun by the process described in Example II above. The pump speed is 9.5 r.p.m. and the concentration of ammonia and water in 1 liter of the acetone dehydrating bath is 159 milligrams and 43 grams, respectively. The flow rate of the acetone is about 760 milliliters per minute. The godets are operated at 6.7, 8.7, and 9.0 r.p.m. to give an over-all stretch of 35%. The false twisters are both operated at 900 r.p.m. The tanning solution below godet 101 in bath 144 is obtained by diluting 1 part by volume of the chormium stock solution described in Example VIII above with 2½ parts of water. As in Example VIII, the formaldehyde tanning solution sometimes present in tanning bath 132 is replaced with a water wash. The tension preceding godets 102 and 103 is 20 grams and 100 grams, respectively. The relative humidity during spinning is 38% and the temperature is 70° F. Under these conditions, the product (250 denier) tested sterile as follows:

TABLE 6

| Dry Straight | Dry Knot | Wet Knot | Papain Digestion | Hot Water Digestion |
|---|---|---|---|---|
| 2.24 | 1.27 | 1.00 | 3.8 | 6.2 |
| 2.42 | 1.37 | 1.06 | 3.8 | 6.5 |
| 2.39 | 1.37 | 1.00 | 3.8 | 6.0 |
| 2.34 | 1.37 | 1.17 | | |
| 2.38 | 1.14 | 1.19 | | |
| 2.37 | 1.51 | 1.12 | | |
| 2.16 | 1.75 | 1.06 | | |
| | 1.78 | | | |

In Table 6, the dry tensile strength in pounds of random electron beam sterilized strands of this example is listed in column 1. Column 2 of this table gives the dry knot strength in pounds and column 3 gives the wet knot strength in pounds. Columns 4 and 5 give the papain and hot water digestion as described in Example II above.

From Table 6, it may be calculated that the average dry straight tensile strength is 2.33 pounds. The average dry knot tensile strength is 1.48 pounds. The average wet knot tensile strength is 1.09 pounds. These values correspond to a dry straight tensile strength of 4.23 grams per denier, a dry knot tensile strength of 2.68 grams per denier, and a wet knot tensile strength of 1.98 grams per denier. The strand of this example is very uniform in diameter, the diameter of ten random samples being 6.2, 6.2, 6.1, 6.4, 6.4, 6.2, 6.3, 6.4, 6.2 and 6.3 mils.

The "indirect" spinning of a dispersion of swollen collagen fibrils to produce a multifilament or tape which is then converted in a second stage process into a rounded strand will now be described as an alternate process, and illustrated by the following examples. FIGURE 28 of the drawings illustrates a one-stage horizontal spinning scheme that is suitable for preparing collagen tape containing from about 40 to several hundred individual monofilaments. It will be understood that the number of monofilaments and the size of the collagen tape produced will depend upon the design of the spinnerette that is used.

With reference now to FIGURE 28, the pump 115 forces a dispersion of swollen collagen fibrils through a spinnerette of the type illustrated in FIGURES 13 and 16, into a rifled spinning column 60 which is shaped to provide good contact between the extruded multifilament and the circulating dehydrating bath. The dehydrating bath enters the spinning column through the conduit 61, flows in the direction that the multifilament is moving through the tube 60 and leaves the spinning column through the conduit 62. The multifilament 63 passes out of the dehydrating bath and is squeezed between the driven godet 70 and the squeeze roller 64 to form a ribbon-like tape in which the individual monofilaments cohere. The collagen tape from the squeeze roller passes around the idler pulley 65 and through the drying tube 66. Air at room temperature enters the drying tube through the conduit 67. The velocity of the air stream is about 13 to 15 cubic feet per minute which will give adequate drying if the tape remains in the drying tube about 2 minutes.

The collagen tape from the drying tube passes over the idler pulley 68 to the driven godet 71 and is wrapped about twelve times around godet 71 and the angle-adjust roll 72 as illustrated in the drawing. The godet 71 in combination with roll 72 acts as a thread advancing unit and permits additional drying of the collagen tape before it is stored on the take-up spool 69. Even winding of the collagen tape on the take-up spool for storage is accomplished with the assistance of a traverse 73 which shuttles back and forth.

Collagen tape may be manufactured by the process described above in various sizes and stored on spools indefinitely. Such collagen tape may be converted as required into a collagen strand of circular cross-section in the second stage of the alternate spinning scheme employing the apparatus illustrated in FIGURE 29.

The machine to be described has been designed for the continuous treatment of collagen tape containing about 195 individual filaments and shaping and tanning the tape to form a rounded strand about 14.5 mils in diameter, but it will be understood that strands of smaller or larger diameter may be produced by varying the number of individual filaments in the collagen tape.

It will be noted from FIGURE 29 that the collagen tape 63 is transferred from the supply reel 69 to the take-up spool 77 by the driven godets 101, 102 and 103. The tape is stretched between godet 101 and godet 102, and is stretched again between godets 102 and 103. Directly below each godet are auxiliary nylon rollers 104, 82 and 83. The rollers 81 and 82 are surrounded by trays 144 and 74 which may be filled with liquids that are to be applied to the moving collagen tape or strand. Other means of treating the moving collagen strand with liquids are provided by the jets 76, 78 and 79.

The tubes 84, 85 and 86 are heated and function to dry and warm the moving strand. The desired circular cross-section of the final product can be accomplished by means of a false twister 80 which operates to round and dry the strand as it moves through the drying tubes 85 and 86.

The three godets 101, 102 and 103 may be made of nylon and each is preferably 3 inches in circumference. Directly below godet 101 is an auxiliary nylon roller 104, as best shown in FIGURE 21. The separation of the collagen tape on godet 101 is controlled by moving the axis of the auxiliary roller 104 with respect to the axis of the godet. The roller 104 pivots on the hinge pin 130 and may be securely fixed in any position by the set screw 131.

The godet 101 is driven at a speed of about 10 r.p.m. At 10 r.p.m., the linear rate of tanning is about 30 inches per minute. The collagen tape from a tensioning device 75 passes three times around godet 101, the three loops providing sufficient time in the bath to wet out the collagen tape well with the solution in tray 144.

Godet 102 is driven at 11 r.p.m. and, therefore, produces a 10% strength in the tape between godet 101 and godet 102. The amount of stretch in this stage may be increased or decreased by varying the relationship between the speeds of godet 101 and godet 102. It will be noted that the strand is wrapped around godet 102 three times. The stretching between godet 101 and godet 102 provides orientation of the drying collagen tape and improves the tensile strength.

Conditions may, for example, be controlled so that the godet 101 is operated at 10 r.p.m., godet 102 is operated at 11 r.p.m., and godet 103 is operated at 12 r.p.m. Under these conditions, one would obtain, in addition to the 10% stretch between godets 101 and 102, another 10% stretch between godets 102 and 103. The overall stretch may be varied from about 10% to 20%.

The moving collagen tape may be continuously treated at godet 101 and godet 102. The solution in the tray 144 may be an alkaline aqueous solution of a polyhydric phenol and/or quinone such as pyrogallol; resorcinol; hydroquinone; 1,6-di-hydroxynaphthalene sulfonic acid; 2,2',4,4' - tetrahydroxy - benzophenone; 1,2 - naphthoquinone; 1,4-naphthoquinone; 2-anthraquinone sodium sulfonate; p-toluquinone; 1,2-anthraquinone; or mixtures of these compounds. In addition to the polyhydric phenol or quinone, the solution may contain a small amount (about 0.5%) of a wetting agent, i.e., the disodium salt of ethylene diamine tetraacetic acid. The concentration of polyhydric phenol and/or quinone in the bath is from about 0.2% to about 2.0%. If this bath is acetic or neutral, the collagen tape will pick up too much water. It is helpful, therefore, to adjust the pH of this bath to about 7.5–10.5 with an alkali such as ammonium hydroxide or sodium hydroxide. Excellent results have been obtained with a pH of 8.3 in the tanning bath.

The collagen tape passes from the tanning bath 144 around the idler pulley 87 and then through the drying tube 84 through which is circulated air, heated to about 150° F.

The dried collagen tape from the tube 84 passes over an idler pulley 83, is wrapped three times around godet 102, and is wet out in the second tanning bath in tray 74. The bath in tray 74 may be an aqueous solution of chromium (III) sulfate and an aldehyde such as formaldehyde or glyoxal, or mixtures of the two. The concentration of chromium as chromic oxide may be about 10 grams per liter, the concentration of formaldehyde and/or glyoxal may be about 0.10% to about 0.32% and the pH of the bath may be about 2.0–3.5 (unbuffered). In passing through this bath, the collagen tape absorbs about 1% by weight of chromium as chromic oxide.

The collagen tape passes from the bath 74 around the idler pulley 89 and through the drying tubes 85 and 86. Air, heated to about 110° to 130° F. is circulated through the tube 85 and air, heated to about 155° F., is circulated through the tube 86.

The collagen tape from the bath 74 is rounded and shaped by contact with a false twister 80. The twisting cycle is most effective when the collagen tape is in the wet state, and this may be controlled by dripping water on the tape from the jet 76. The strand may also be lubricated just prior to contact with the false twister with distilled water which is added through the jet 78. When the twist backs up to the pulley 89 as the wet tape emerges from it, a gradual tapering effect of the strand takes place, which rounds it out. The circular shape of the strand remains after the twist is cancelled. The false twister is operated in the range of 150 to 1000 r.p.m.

It is important that the water added through the jet 76 and the velocity and temperature of the air in the drying tubes 85 and 86 be controlled so that the wet tanned tape is sufficiently dry when the strand contacts the false twister 80 to avoid deformation. This results in an improved circular cross-section.

The round collagen strand passes from the false twister 80 around the idler pulley 90 and may contact with a solution from the jet 79 flowing downwardly in a direction opposite to the direction in which the collagen strand is moving. The solution from jet 79 may be an aqueous solution of from about 0.08% to about 0.3% formaldehyde adjusted to a pH of about 9.

The wetted out strand from the jet 79 passes through the drying tubes 86 and 85 around the idler pulley 91 and returns through the drying tubes 85 and 86 around idler pulley 92. The dry tanned and rounded strand is removed from the godet 103 by the take-up spool 77 at about 36 inches per minute.

It has been observed that atmospheric humidity, a variable during the spinning of a strand, plays an important part in the stretch and the final tensile strength of the strand. The humidity is preferably controlled by encasing the spinning operation within the smallest practical enclosure into which air of controlled humidity may be introduced. Superior uniform strands may be obtained when the relative humidity is maintained at about 40%.

*Example X*

That portion of the Deep Flexor tendon of cattle designated in FIGURE 2 as the "D" section is cleaned of fat, superficial non-collagenous protein and other extraneous matter and is sliced on an electric meat-slicing machine in the frozen condition. The tendon sections are sliced perpendicularly to their longitudinal axis to a thickness of about 11 mils.

The sliced tendon is next treated with an enzyme solution to dissolve elastin. The enzyme solution is prepared by dissolving 0.15 part of ficin and 3.75 parts of ethylenediamine tetrasodium tetraacetate in 750 parts of water. Seventy-five parts of the sliced tendon is immersed in this solution which is stored at room temperature overnight. Then 2.25 parts of 30% hydrogen peroxide is added to destroy any residual ficin.

To this mixture of tendon slices in about 750 parts of water is added an additional 2244 parts of water and 5.87 parts of cyanoacetic acid. The swelling solution is cooled to below about 25° C. This mixture is stirred in the dispersion kettle illustrated in FIGURE 3 at about 60 r.p.m. Stirring is continued for about three hours, during which time the individual collagen slices are swollen. The dispersion is then homogenized by repeated passes through the pump 107 and the series-connected jets 108 and 109 as described above in Example I. During the homogenization, the stirrer in the dispersion kettle is operated intermittently.

The pressure on the high pressure side of the homogenization jets falls to 70 pounds per square inch and remains constant after 3.5 hours, indicating substantially complete homogenization. The dispersion is then forced through a leaf filter containing three screen of #316 stainless steel. The screens are separated by ⅛-inch spacers and decrease in mesh size so that the dispersion first passes a 14-mil screen, then a 9-mil screen and finally a 4-mil screen. During the filtration step, the pressure on the filter is maintained below about 40 pounds per square inch at all times. The dispersion of swollen collagen fibrils so obtained analyzes 0.80% solids and has a pH of 2.52.

This collagen dispersion is extruded through a stainless steel spinnerette drilled with 192 openings arranged in concentric circles into an acetone dehydrating bath containing 130 milligrams of ammonia and 50 grams of water per liter. The apparatus employed is that illustrated in FIGURE 28. The godet 70 has a circumference 4½ inches and is driven at 6.7 r.p.m. The godet 71 also has a circumference of 4½ inches and is driven at 8.3 r.p.m. Air at room temperature is circulated through the drying tube 66 at the rate of 14 cubic feet per minute. The collagen tape collected on the take-up spool 69 was 60 to 70 mils in width and about 4 mils in thickness. A much enlarged cross-sectional view of this tape illustrating the appearance of a thin cross-section under the microscope is shown in FIGURE 34. Although the individual filaments cohere together to form a unitary structure, the outline of the individual filaments that make up the collagen tape may be seen upon microscopic examination.

*Example XI*

A collagen tape approximately 4 mils thick and 60 mils wide containing 192 individual filaments is processed on the apparatus illustrated in FIGURE 29. The speed of the godets 101, 102 and 103 is maintained at 10.0, 11.0 and 12.0 r.p.m., respectively. A solution of 0.4 part of pyrogallol, 0.1 part tetrasodiumethylene diaminetetraacetic acid and 99.5 parts of deionized water is adjusted to pH 8.3 with ammonium hydroxide and placed in the tray 144.

A solution of chromium (III) sulfate comprising 0.8 part of chromium as chromic oxide, 0.5 part of lactic acid (85%), 0.24 part of formaldehyde and 98.46 parts of deionized water in adjusted to pH 2.7 with sodium hydroxide and placed in the tray 74.

A solution of 0.16 part of formaldehyde and 99.84 parts of deionized water is adjusted to pH 9.0 with ammonium hydroxide and placed in a reservoir feeding the jet 79. Deionized water is fed to the drips at the top of the drying tube (jet 76) and the top of the twister (jet 78).

The collagen tape 63 from the tensioning device 75 passes to the godet 101 and is wrapped three times around the godet and idler 104, the latter being immersed in the bath 144. It takes approximately fifteen seconds to travel one wrap so that the total exposure to the solution in tray 144 is about 45 seconds. The pyrogallol treated strand then moves into the drying tube 84 and is subjected to a current of warm air heated to 60° C. The partially dried strand from the tube 84 passes over the idler pulley 88 and is wrapped three times around godet 102 and auxiliary roller 82. At this time, the moving strand contacts the solution in container 74.

From the solution in container 74, the strand travels to the top of the drying tube 85 where it contacts a stream of deionized water dripping from the jet 76. This serves to saturate the strand with water for better bonding during twisting and also helps to remove excess chromium salts. As the strand moves downwardly through the drying tubes 85 and 86, it meets a counter current stream of warm air at about 60° C. and is twisted by the false twister 80, which is rotating at approximately 300 r.p.m. Just before the strand enters the false twister, it is lubricated with deionized water from the jet 78. This prevents abrasion during the untwisting process. The now rounded strand is next washed with the alkaline formaldehyde solution from jet 79 and finally dried by a double passage through the drying tubes 85 and 86. The finished strand is taken up on the godet 103, five to ten wraps being required to prevent slipping, and is stored on the take-up spool 77. In the process described above, about 10% stretch is applied between godet 101 and 102 and another 10% stretch is applied betwen godet 102 and godet 103.

The collagen strand so obtained has a diameter of 15.0 mils (1270 denier), a dry straight tensile strength of 3.93 grams per denier, a dry knot strength of 2.00 grams per denier, and a wet knot strength of 1.25 grams per denier. The tensile strength of this strand 10 days after implantation in a rat is 3.2 pounds. After 15 days implantation, the tensile strength dropped to 1.9 pounds.

A thin cross-section of this strand upon microscopic examination resembles a jelly-roll in that the collagen ribbon or tape appears to be rolled up on itself. FIGURE 35 is a greatly enlarged view of a cross-section of a collagen strand made by the process of Example XI as it appears under the microscope. The outline of the 192 individual collagen filaments that made up the collagen tape may be seen at high magnification. Collagen sutures prepared by the method described above in this example are of uniform size and quite smooth, although slight longitudinal striations are sometimes present.

*Example XII*

A size 2/0 suture (diameter 15 mils) may be conveniently spun by the "indirect" spinning process. A multifilament is first spun substituting for the brass spinnerette previously described a stainless steel spinnerette drilled with 192 openings arranged in concentric circles. Each opening to the spin bath is approximately 18 mils in diameter and each opening has a 30° taper from this diameter at a point 34 mils from the spinnerette surface to a 3/32-inch opening at the bottom surface of the spinnerette.

A collagen dispersion (0.78% solids) is spun in the vertically upward spinning machine illustrated in FIGURE 9. The pump 115 is operated at 64 r.p.m. to extrude 19.1 milliliters of the dispersion each minute. The spinning column used has an inside diameter of 1 1/16 inches and the acetone dehydrating bath is circulated through this spinning column at the rate of about 2380 milliliters per minute. The multifilament that emerges from the dehydrating bath is wrapped 1½ times around godet 101 and passes to the false twister. To avoid bonding of the multifilament, the filaments are not wet out at the godet 101, and the false twister 112 is rotated at 200 r.p.m. The speed of godets 101 and 102 is maintained at 6.7 and 8.7 r.p.m., respectively, thus producing a stretch between godets 101 and 102 of 30%. Heat is applied by the heater 133 below false twister 112 and the dried multifilament is wrapped 12 times around the godet 102. From godet 102, the multifilament passes directly to the takeup spool.

To convert the multifilament described above to a round and bonded size 2/0 strand, the multifilament may be reprocessed on the spinning machine illustrated in FIGURE 9. The multifilament from the take-up spool is given one wrap around godet 101 and wet with water in the bath 144 (FIGURE 21). The speed of the godets 101, 102 and 103 is maintained at 6.7, 8.3 and 8.7 r.p.m., respectively, thus providing 25% stretch between godets 101 and 102 and 5% stretch between godets 102 and 103. Both false twisters are operated at 400 r.p.m. The strand is wrapped 12 times around godet 102, and the strand is continuously tanned by two dips in the tanning bath 132 below the godet 102. The tanning solution is made up by diluting 1 liter of the chromium stock solution described in Example VIII with 1 liter of water containing 8 milliliters of 40% formaldehyde, and is circulated to the bath at the rate of 50 milliliters per minute, 25 milliliters per minute through each jet. The dried strand received by the take-up spool is round and uniform in crosssection. While the physical properties will vary according to the amount of tanning, the tensile strength characteristics exceed the requirements set out in the Pharmacopeia of the United States, vol. XV, page 708.

By the process described above, one may extrude absorbable sutures that are superior to sutures prepared from intestines, both in strength and uniformity. The sutures of the present invention retain more than half of their strength (straight tensile) 6 or 7 days after being implanted in the animal body. The rate of digestion in the animal tissues is of course dependent upon the degree of tanning. Chrome-tanned strands will retain more than half of their tensile strength for about 15 days after being implanted in the animal body.

From the preceding description and examples, it will be understood that the round collagen strands of the present invention are constructed of a plurality of collagen monofilaments arranged in parallel. These parallel collagen monofilaments cohere to adjacent monofilaments but do not fuse completely together as the individual filaments may be recognized at all stages of the spinning process. The appearance under the microscope of these parallel monofilaments as they exist in collagen tape is illustrated by FIGURE 34. FIGURE 35 is a cross-sectional view of a collagen strand of the present invention made from collagen tape by the two-stage spinning process. The individual monofilaments are still visible upon microscopic examination as indicated by the draftsman in the pie-shaped section of that drawing.

A simple experiment that may be performed to demonstrate the parallel arrangement of the collagen monofilaments in the product of the present invention is illustrated in FIGURE 33. If one end of a collagen strand manufactured by the present process is soaked in a dilute acid solution and flexed repeatedly, the individual monofilaments may be separated and approximately equal numbers of monofilaments can then be grasped by the fingers of each hand and pulled apart in the direction of the arrows in FIGURE 40. Under these conditions, the two bundles of monofilaments may be separated, splitting the strand lengthwise as illustrated in the drawing.

The behavior of catgut is entirely different because that product is made by twisting together a plurality of collagen ribbons derived from sheep intestines. Since the ribbons that make up regular production catgut are twisted together in a helical fashion, the test outlined above may be employed to distinguish between the product of the present invention and regular production catgut. If one end of a conventional catgut suture is soaked in dilute acid solution and flexed repeatedly, the individual ribbons may be separated. An approximately equal number of ribbons can then be grasped between the fingers of each hand and pulled apart in the direction of the arrows in FIGURE 32. Under these conditions, the two bundles of ribbons can only be separated with difficulty because as the ribbons unravel, they tangle around the suture as illustrated in FIGURE 32.

The collagen monofilaments that make up the collagen strand are, themselves, composed of collagen fibrils arranged in parallel. This arrangement of the fibrillar units within the collagen monofilament may be observed in FIGURE 31. In this electron micrograph (magnification 105,500 times), the 640 A. spacing characteristic of the collagen fibrils is readily distinguished. This is evidence that the collagen fibrils have not suffered any morphological alteration during the entire process of the present invention.

If the collagen strand of the present invention is added to a dilute aqueous acid solution and agitated in a Waring Blendor with an excess of the acid solution, a dispersion of swollen collagen fibrils is recovered. Unless the collagen strand is tanned, the swollen collagen fibrils recovered from the strand are identical in appearance with those present in the dispersion that is extruded. Although swollen collagen fibrils are quite transparent and virtually invisible by ordinary microscopic means, the individual fibrils are plainly visible and can be measured and otherwise characterized in a phase-contrast microscope. The diameters of the acid swollen collagen fibrils range from less than 0.5 micron to about 3.0 microns and their lengths range from about 5.0 microns to a maximum approximating the thickness of the tendon slices used to make the dispersion. Branched or forked forms of the fibrils are never seen and their ends are always square cut rather than frayed, broomed or tapered, indicating that they are in fact the smallest fibrillar component of the collagen strand. The swollen fibrils fall into two major morphological groupings: fibrils measuring 0.5 to 2.5 microns in diameter with no internal differentiation, and fibrils from 2.0 to 3.0 microns in diameter with a distinct dense central core. In a freshly prepared dispersion of collagen fibrils, less than three days old, the core-type of fibril constitutes about 20% of the total number of fibrils in the dispersion. In older dispersions, the percentage of these fibrils is considerably higher (60% in a 6-month old preparation), indicating that the coreless fibrils may continue to swell over a long period of time until they assume the appearance of the cored variety. The maximum diameter of the swollen fibrils in an old dispersion is considerably greater than in a fresh dispersion (9 microns as compared to 3 microns), providing additional evidence that the fibrils continue to swell over a long period of time.

If the collagen strand is tanned, the original fibrillar structure may still be recovered by agitating in a Waring Blendor with an excess of aqueous acid solution, but the tanned fibrils resist swelling and remain smaller in diameter than the swollen collagen fibrils present in the original dispersion prior to extrusion.

The present application is a continuation-in-part of our copending application Serial No. 768,969, filed October 22, 1958 and Serial No. 695,760 filed November 12, 1957, both now abandoned.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

What is claimed is:

1. A collagenous article comprising extruded monofilament consisting essentially of collagen fibrils having throughout their entire length, in the monofilament as in their natural state, typical banding at intervals of approximately 640 Angstrom units and rectilinearity; substantially all of said fibrils having an alignment parallel to the longitudinal axis of the monofilament which contains them.

2. A collagenous article according to claim 1 free of elastin.

3. A collagenous article comprising a multiplicity of monofilaments consisting essentially of collagen fibrils having throughout their entire length, in the monofilaments as in their natural state, typical banding at intervals of approximately 640 Angstrom units and rectilinearity; substantially all of said fibrils having an alignment parallel to the longitudinal axis of the monofilament which contains them; said monofilaments being bonded to each other along their longitudinal surfaces to form a unitary linear structure, and disposed in parallel contiguity with respect to each other; and said unitary structure having a longitudinal axis in substantial parallelism with the longitudinal axis of the various monofilaments therein.

4. A collagenous article according to claim 3 which is circular in cross-section.

5. An article of manufacture according to claim 3, wherein each monofilament is bonded to each monofilament contiguous thereto throughout the entire extent of their contiguity.

6. A collagenous article including a multiplicity of monofilaments disposed in the form of a tape having substantially greater width than thickness and comprising collagen fibrils having throughout their entire length, in the monofilaments as in their natural state, typical banding at intervals of approximately 640 Angstrom units and rectilinearity; substantially all of said fibrils having an alignment parallel to the longitudinal axis of the monofilament which contains them; said monofilaments being bonded to each other along their longitudinal surfaces to form a unitary linear structure, and disposed in parallel contiguity with respect to each other; and said unitary structure having a longitudinal axis in substantial parallelism with the longitudinal axis of the various monofilaments therein.

7. An article of manufacture according to claim 6, wherein the tape is convoluted about its longitudinal axis with each convolution bonded with adjacent convolutions.

8. A collagenous article according to claim 6, wherein the tape has opposed principal faces with substantially the same spacing throughout the extent of their areas; said tape being impregnated with a collagen tanning agent substantially uniformly throughout its length and to a degree depending upon distance from the nearer of said principal faces.

9. A collagenous article according to claim 6, wherein the tape is of uniform width and thickness with substantially greater width than thickness and having opposed principal faces with substantially the same spacing throughout the extent of their areas; said tape being convoluted about its longitudinal axis with each convolution bonded with its adjacent convolutions; said tape being impregnated with a collagen tanning agent substantially uniformly throughout its length and to a degree depending upon distance from the nearer of said principal faces; whereby the tanning throughout the collagenous article is substantially uniform.

References Cited in the file of this patent

UNITED STATES PATENTS

| | | |
|---|---|---|
| 1,999,641 | Sharp | Apr. 30, 1935 |
| 2,039,262 | Schulte | Apr. 28, 1936 |
| 2,374,201 | Highberger | Apr. 24, 1945 |
| 2,461,602 | Hollihan | Feb. 15, 1949 |
| 2,475,697 | Cresswell | July 12, 1949 |
| 2,598,608 | Salo et al. | May 27, 1952 |
| 2,748,774 | Novak | June 5, 1956 |

UNITED STATES PATENT OFFICE
CERTIFICATE OF CORRECTION

Patent No. 3,114,372                          December 17, 1963

Ernest J. Griset Jr., et al.

It is hereby certified that error appears in the above numbered patent requiring correction and that the said Letters Patent should read as corrected below.

Column 12, line 44, for "171" read -- 17.1 --; line 66, for "9.1" read -- 9.0 --; column 13, line 41, for "1.65" read -- 6.5 --; line 72, for "Tha" read -- That --; column 15, line 43, for "(0.2%" read -- (0.2%) --; column 22, line 48, for "betwen" read -- between --.

Signed and sealed this 23rd day of June 1964.

(SEAL)
Attest:

ERNEST W. SWIDER                          EDWARD J. BRENNER
Attesting Officer                            Commissioner of Patents